(12) United States Patent
Bollman et al.

(10) Patent No.: US 11,792,350 B2
(45) Date of Patent: *Oct. 17, 2023

(54) WIRELESS NETWORKED RECORD SESSION DEVICE

(71) Applicant: FUN IN THERE ENTERTAINMENT LLC, Rehoboth Beach, DE (US)

(72) Inventors: William Bollman, Rehoboth Beach, DE (US); Kevin Carrico, Royal Oak, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,995

(22) Filed: Dec. 27, 2021

(65) Prior Publication Data

US 2022/0124223 A1 Apr. 21, 2022

Related U.S. Application Data

(63) Continuation of application No. 17/098,670, filed on Nov. 16, 2020, now Pat. No. 11,212,426, and a continuation of application No. 15/283,713, filed on Oct. 3, 2016, now Pat. No. 10,841,462.

(60) Provisional application No. 62/262,580, filed on Dec. 3, 2015, provisional application No. 62/239,017, filed on Oct. 8, 2015, provisional application No. 62/237,190, filed on Oct. 5, 2015, provisional application No. 62/235,842, filed on Oct. 1, 2015.

(51) Int. Cl.
| | |
|---|---|
| *H04N 5/222* | (2006.01) |
| *H04L 67/10* | (2022.01) |
| *H04N 5/91* | (2006.01) |
| *G10H 1/00* | (2006.01) |
| *H04N 9/82* | (2006.01) |
| *G11B 27/00* | (2006.01) |
| *G11B 27/031* | (2006.01) |
| *H04N 5/262* | (2006.01) |

(52) U.S. Cl.
CPC ......... *H04N 5/2224* (2013.01); *G10H 1/0091* (2013.01); *G11B 27/00* (2013.01); *G11B 27/031* (2013.01); *H04L 67/10* (2013.01); *H04N 5/91* (2013.01); *H04N 9/8205* (2013.01); *H04N 9/8211* (2013.01); *G10H 2210/145* (2013.01); *G10H 2210/155* (2013.01); *H04N 5/2621* (2013.01)

(58) Field of Classification Search
None
See application file for complete search history.

(56) References Cited

U.S. PATENT DOCUMENTS

| | | | |
|---|---|---|---|
| 4,688,117 A * | 8/1987 | Dwyer | G11B 27/28 369/69 |
| 9,691,429 B2 | 6/2017 | Leiberman et al. | |

(Continued)

*Primary Examiner* — Gelek W Topgyal

(57) ABSTRACT

A social entertainment user interface operating on a wireless networked record session device capable of producing a live video and/or audio stream as if made in a vintage record booth. Record sessions are listened to and/or watched by a plurality of other social entertainment user interfaces operating on other networked listening/watching wireless networked devices. Video and audio filters emulate various altered looks and sounds. Record sessions are streamed live or near-live for other social entertainment user interfaces operating on other networked wireless devices to listen and/or watch, and passively and actively rated to dynamically enable watching of the most preferred record sessions.

16 Claims, 6 Drawing Sheets

(56) References Cited

U.S. PATENT DOCUMENTS

| | | | |
|---|---|---|---|
| 9,992,470 B1* | 6/2018 | Hofmann | H04N 5/77 |
| 2005/0097613 A1* | 5/2005 | Ulate | H04N 7/15 |
| | | | 348/E7.083 |
| 2008/0098032 A1* | 4/2008 | Wu | G11B 27/034 |
| 2010/0148442 A1* | 6/2010 | Walker | G07F 17/32 |
| | | | 273/142 E |
| 2012/0233072 A1* | 9/2012 | Calman | G06Q 40/02 |
| | | | 705/44 |
| 2012/0311445 A1* | 12/2012 | Cabanilla | G11B 27/3027 |
| | | | 715/716 |
| 2013/0239163 A1* | 9/2013 | Kim | H04N 21/2665 |
| | | | 725/115 |
| 2014/0053217 A1* | 2/2014 | Rivera | G06F 3/04842 |
| | | | 725/80 |
| 2014/0229831 A1* | 8/2014 | Chordia | G11B 27/031 |
| | | | 715/717 |
| 2014/0267749 A1* | 9/2014 | Frigon | H04N 1/00838 |
| | | | 348/159 |
| 2015/0127754 A1* | 5/2015 | Clark | H04L 51/10 |
| | | | 709/206 |
| 2015/0189397 A1* | 7/2015 | Rivera | H04N 21/41265 |
| | | | 725/80 |
| 2015/0237389 A1* | 8/2015 | Grouf | H04N 21/458 |
| | | | 725/49 |
| 2015/0281643 A1* | 10/2015 | Calvagna | H04M 1/72439 |
| | | | 348/14.03 |
| 2015/0334341 A1* | 11/2015 | Warren | H04N 5/77 |
| | | | 386/224 |
| 2016/0007052 A1* | 1/2016 | Haitsuka | H04N 21/2407 |
| | | | 725/115 |
| 2016/0078853 A1* | 3/2016 | Gonczi | A63F 13/42 |
| | | | 700/91 |
| 2016/0234551 A1* | 8/2016 | Allegretti | H04N 21/854 |
| 2016/0255036 A1* | 9/2016 | Hebbar | H04L 51/52 |
| | | | 709/206 |
| 2016/0277802 A1* | 9/2016 | Bernstein | H04N 21/44213 |
| 2016/0358595 A1* | 12/2016 | Sung | G11B 27/031 |
| 2018/0084204 A1* | 3/2018 | Berman | H04N 1/00161 |

* cited by examiner

WIRELESS NETWORKED RECORD SESSION DEVICE

The present invention is a continuation of U.S. application Ser. No. 17/098,670, filed Nov. 16, 2020, now U.S. Pat. No. 11,212,426; which in turn is a continuation of U.S. application Ser. No. 15/283,713, filed Oct. 3, 2016, now U.S. Pat. No. 10,841,462; which in turn claims priority from U.S. Provisional No. 62/235,842, filed Oct. 2015; and from U.S. Provisional No. 62/237,190, filed Oct. 5, 2015; and from U.S. Provisional No. 62/239,017, filed Oct. 8, 2015; and from U.S. Provisional No. 62/262,580, filed Dec. 3, 2015; the entirety of all of which are expressly incorporated herein by reference.

BACKGROUND OF THE INVENTION

1. Field of the Invention

This invention relates generally to a recording studio. More particularly, it relates to a network of recording studios to share recording sessions in a social media format.

2. Background of Related Art

The record booth gained prominence during World War II. The most common example was first introduced in 1941 by Mutoscope International with a record booth called a Voice-O-Graph record booth. Several models of the Voice-O-Graph record booth were ultimately manufactured, including a 1941 model, a 1943 model, a 1947 model, a 1957 model, and a late 1960s model.

The Voice-O-Graph enabled a user to insert coinage (e.g., 25c, 35c, 50c) whereby a cardboard based, lacquer coated 78 rpm audio record was made from the live recording session, played back to the user, then vended to them.

The Voice-O-Graph record booth, in its original form, essentially disappeared from the public scene over half a century ago.

BRIEF DESCRIPTION OF THE DRAWING

Features and advantages of the present invention become apparent to those skilled in the art from the following description with reference to the drawings.

DETAILED DESCRIPTION OF ILLUSTRATIVE EMBODIMENTS

Figure 1:
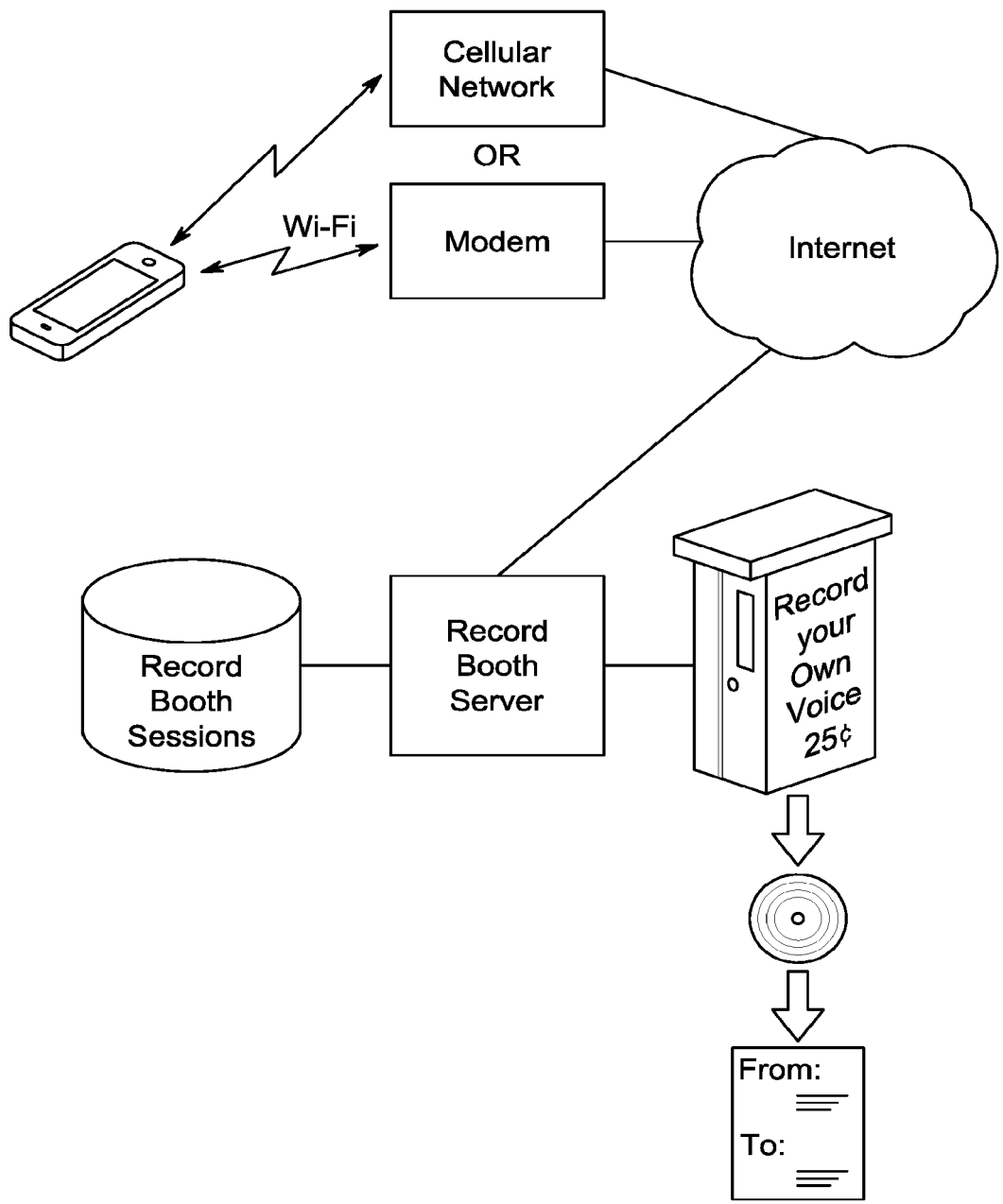
FIG. 1 shows an exemplary record booth session network to provide 45 rpm record making services, in accordance with the principles of the present invention.

The present invention improves the functioning of a mobile device such as an iPhone by enabling it organized and optimized creation to create a record booth session, and access to view or listen only, in near real-time, preferred video and audio from multiple external other sources, of limited length, and optimized according to multiple categorizations, while avoiding videos and audio from multiple external sources that are less desirable, or not within a desired categorization, or subject matter.

The invention provides a record booth session network, comprised of a plurality of wireless devices each running an application to operate as a record booth and produce a live video and/or audio record booth session.

The invention improves the operation of a mobile device to filter through video streams from many other mobile devices networked through a record booth sessions network. When creating a limited-length record booth session, the mobile device is improved to enable a user to define a desired channel to store the video in, and within that desired channel a category. The category may either be chosen from a prompted list of the latest trending categories (trending in near-real-time); may be entered manually to perform a search of all current categories; or a new category may be started by that mobile device record booth.

From the perspective of a mobile device in watching or listening mode, the mobile device is improved to enable a record booth to watching or listen to pre-filtered videos or audio according to a set channel, and set category if desired. Preferably, the filtered video stream is presented to the mobile device record booth with individual record booth sessions that are in the set channel, and if categorization filtering is turned on then the record booth video stream is further filtered to present videos in the video stream that meet the selected category. The category within a given channel is set by the record booth mobile device in watching mode by a prompt of, e.g., the most recently trending categories within that channel; or the user can enter a search term and search all categories for a desired category.

The result provides an mobile device that is improved to present an entertainment network including multiple channels, each channel being focused by settings in the record booth mobile device (if desired) to a selected category of videos, thus providing a custom video stream containing only desired video from many other record booth mobile devices all concatenated into a single video stream such that only video of desired content is transmitted to the record booth mobile device by the record booth sessions network.

The record booth session network provides a new type social media/entertainment media that forms a modern take on entertainment. The record booth session network self-generates an entertainment stream (video or just audio) for people to watch/listen to, all fueled by weekly sponsored contests to generate the most popular 65 second record booth session. An hour's worth of the day's best record booth sessions are looped in one entertainment stream (video or audio) and the week's best are looped in another entertainment video/audio stream. A new 'watcher' of the record booth session network is immediately thrust into watching the very best entertainment stream (the weeks best), or dig deeper and watch the day's best entertainment stream, or search for favorite record booths to watch. They can go as deep into the streams as they want. The record booth session network self-generates a stream of the very best record booth recordings, and gives access to watch 'lesser' entertainment streams.

The record booth session network has built-in incentive to both attract record booth devices to enter that week's contest (for whatever prize), utilizing contest entry tokens, as well as to attract viewers who merely watch the video or audio streams formed by record booth sessions as self-generating, and self-organizing, entertainment.

Sponsor branding videos may be injected into the entertainment streams generated during a given contest within the record booth session network, and revenue from contest entry and token purchases may be shared with sponsors. Moreover, users of wireless record booth devices will be incentivized to self-promote record booth sessions made on their own wireless record booth device, on their own social media channels, to encourage other wireless record booth devices to watch and otherwise contribute to a rating that will automatically promote a given record booth session to a day's best, or a week's best entertainment channel.

Preferably, the user interface of the record booth is a functional depiction of the inside of a particular model of the Voice-O-Graph record booth, e.g., the inside of the 1947 Voice-O-Graph record booth.

To operate the record booth and generate a live record booth session, a user purchases one or more tokens, quarters or other coinage. For instance, a 25¢ 'token' may be purchased on account and billed to PayPal or whatever. The tokens may be paid for in bulk, e.g., monthly, for efficiency and convenience.

To start the record booth, the user preferably taps a visual depiction of a coin slide or coin entry plate in the graphical user interface showing the inside of a 1947 Voice-O-Graph record booth to 'insert coin' and start the record booth.

Preferably, the record booth visually depicts an animation (or actual video) of a record blank being loaded onto the turntable of the relevant model of Voice-O-Graph record booth. Record blanks may be clear plastic. Alternatively, the record blanks may be shown as being black, or any other color or combination of colors.

Visual signals, on the depicted instruction "backglass" of the user interface displayed on the display screen of the wireless device, operate in the wireless record booth similar to the signaling in a real 1947 or 1957 Voice-O-Graph recording studio, including:

GET READY arrow lights;
65 SECONDS TO GO lights, together with RECORDING WHEN LIT light, etc.;
30 SECONDS TO GO light;
WARNING, 10 SECONDS TO GO light;
STOP! RECORDING COMPLETE light.

Preferably, the record booth sessions are short, e.g., most preferably 65 seconds in length. Most preferably, the length is not sufficient for a typical entire song.

A nixie tube countdown clock may be provided in any suitable time format, e.g., starting at "1:05" counting down to "0:00"; or starting at "65" and counting down to "0".

45 rpm Record

Figure 2:
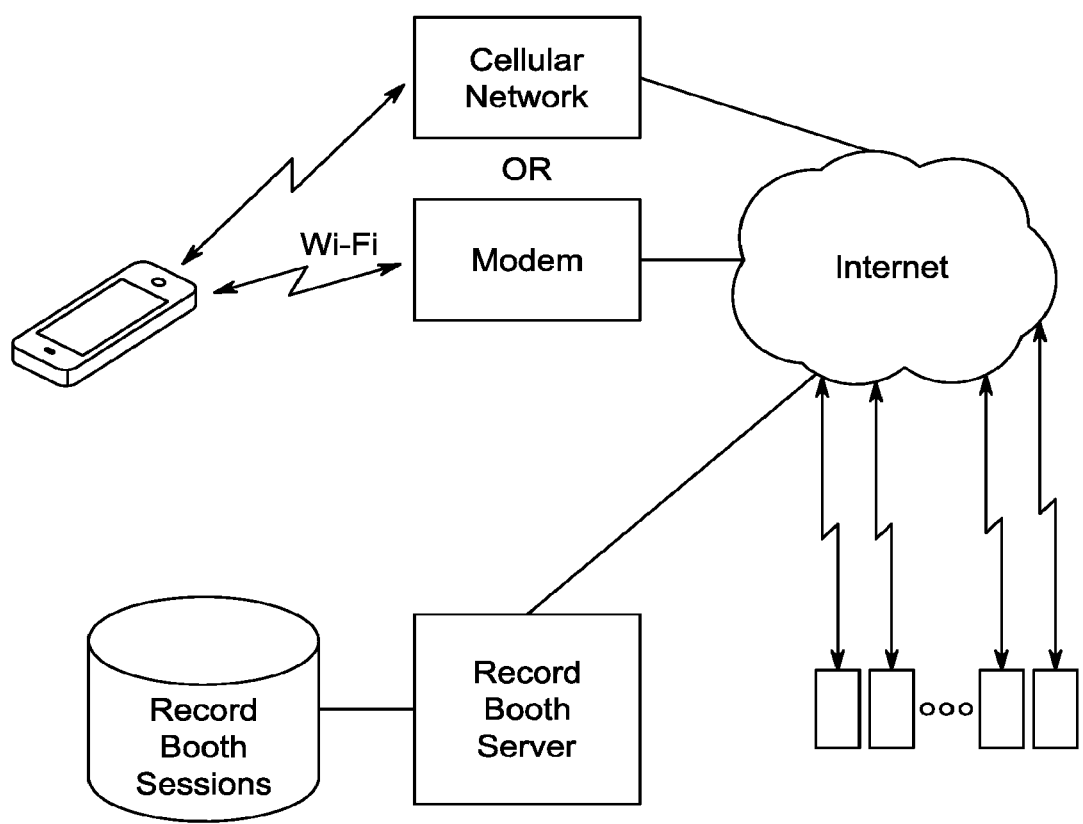
FIG. 2 shows a record booth session network to provide live streaming presentation of record booth sessions to a plurality of listening/watching Smartphone devices, in accordance with the principles of the present invention.

FIG. 2 shows an exemplary record booth session network to provide 45 rpm record making services, in accordance with the principles of the present invention.

In particular, as shown in FIG. 2, an actual 'direct-to-vinyl' plastic record may be made from any record booth session, uploaded to a record booth server, stored in a record booth sessions database, queued for cutting on a record lathe or actual record booth in turn by an appropriate technician, then mailed directly to a supplied address. Preferably an additional cost is associated with the making and mailing of an actual record. The records are preferably 45 rpm records, but may be 33 ⅓ rpm. The records are further preferably 6" diameter, though 7" diameter is a possibility. A plurality of different record booth sessions may be concatenated onto a single record, e.g., a 10" or 12" LP style record.

Thus, after completion of any given record booth session, a prompt is presented to the user interface asking if they want a 45 rpm record made. If so, appropriate payment would be made or put on account. A visual token may be purchased and entered into the user interface by touch screen commands. Prompts are preferably provided to obtain necessary information such as name and address to send the 45 rpm record to. For efficiency, a last-entered mailing address may be presented to the user for confirmation. Alternatively, the selection of the option to have a 45 rpm record made may be made before the record booth session begins. The selection may be made by selection from a dropdown menu of possibilities, either before or after the record booth session.

An image file may be uploaded to serve as liner notes, and included with the mailed record.

The record booth user interface importantly uses the front-facing camera of the phone to video record the record session. Thus, the video image will typically be of one or more persons singing or speaking in front of the wireless device record booth.

The record booth network preferably includes a social network feature—the record booth 65 second fair use sessions of all app users are streamed LIVE for the masses (per authorized agreement upon initial installation of the Record Booth app in the user's phone).

CONFIGURABLE OPTION: The streams may be audio only, or video with audio.

The Record Booth app provides an opportunity (for those who step into their own personal wireless device record booths) to be heard and/or watched in a social network environment!

Live Streaming

Figure 3:
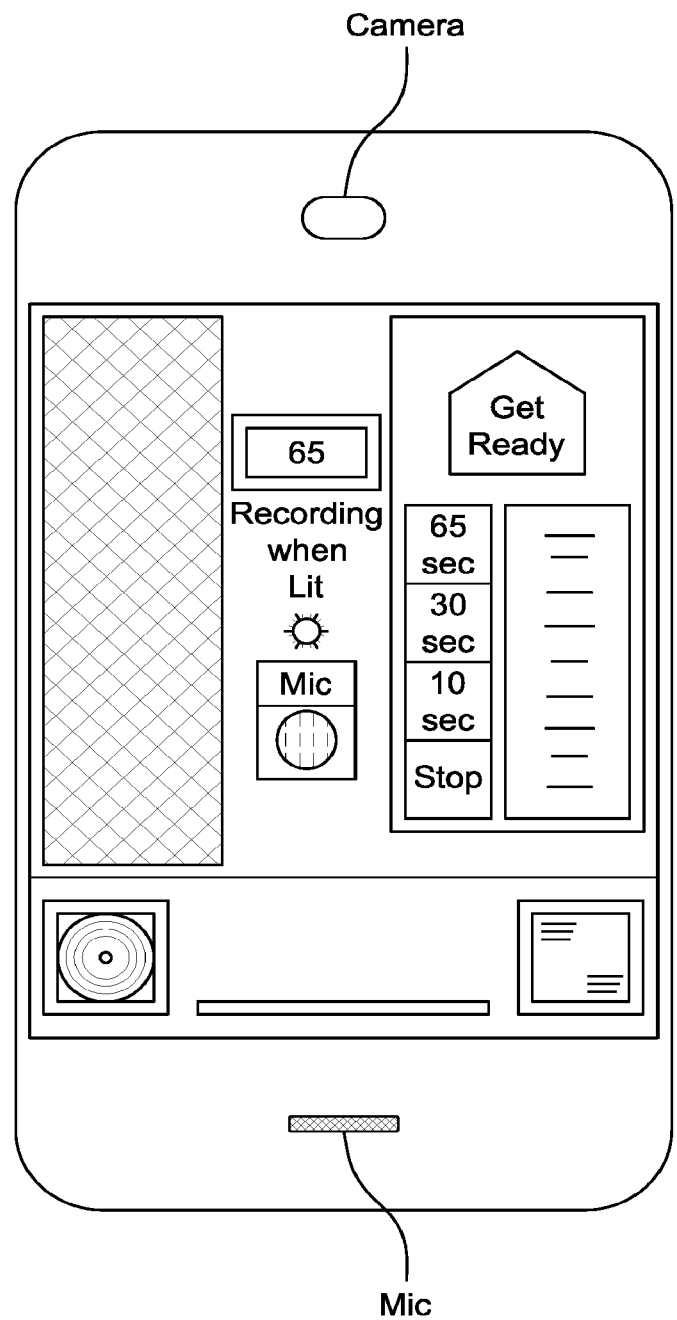
FIG. 3 shows an exemplary user interface operating on a Smartphone, e.g., an iPhone, in accordance with the principles of the present invention.

FIG. 3 shows a record booth session network to provide live streaming presentation of record booth sessions to a plurality of listening/watching Smartphone devices, in accordance with the principles of the present invention.

In particular, as shown in FIG. 3, the record booth session is a LIVE video stream uploaded to the Record Booth server—not stored locally on the wireless device then significantly later uploaded by the user. An advantage to this is that it significantly limits use of the record booth in large venues such as concerts as streaming video is a practical impossibility in such a venue because of the limitations of available resources. A disadvantage is that because of the demands of live streaming, video quality and the ability to post-process and edit video may suffer due to video compression. Nevertheless, to the extent that the live video stream must be buffered/stored locally for a short period of time while or just before upload to the Record Booth server, the buffer/storage is made invisible to the user and occurs entirely in the background. A significant delay is avoided between the recording of the record booth session, and upload to the record booth server. Preferably, though not necessarily, post-processing of a record booth session is made difficult for an average user, if at all possible, to preserve the raw and genuine nature of live audio and/or video.

Audio, however, of the record booth session may be saved locally to an audio file that may be located and later played back by the user, serving as a record booth session playback function. As a premium option, video of the record booth session stored (at least temporarily) on the Record Booth server may be made available, for a given amount of time, to the record booth on the Record Booth server.

Preferably, as a configurable option (e.g., as a premium service), the record booth user may download back down the record booth session that was uploaded essentially live. Also, as a configurable option (e.g., as a premium service), the record booth user may be given the ability to search and download from the record booth server, audio and/or video from any other record booth.

After recording a record booth session, that recording record booth preferably displays a queued position, or time to live presentation on a given presentation channel, indicating approximately when the record booth session will be played live to other users.

If there are fewer live record booth sessions than available time to fill, the user device may either mute the audio output during extended periods of time when no live record booth session is currently available for the given channel, or alternatively the user device may return to another audio source from a different application (such as a streaming radio station, etc.) until which time a new live record booth session does become available. Then, the user device will switch the currently output audio source back to audio from the record booth to play the newly live record booth session.

Each Record Booth app is uniquely named by the phone owner. Famous names, trademarked names, etc. are individually verified and indicated to listeners as being certified, e.g., using a check mark aside the record booth name, etc.

A visual LINER NOTE (one sided) may be uploaded through the record booth for display during AUDIO presentation, and/or used as an icon when users are selecting from among available live record booth sessions, etc.

Recordings may be pre-categorized by the person paying the 25c, for more organized selection by listeners. Categories may include, e.g.:
  A CAPELLA
  W/INSTRUMENT
  SPEAKING
  COMEDY
  ORIGINAL SONG/SONGWRITERS
Sub-categories may include, e.g.:
  ALL/general
  ROCK
  POP
  COUNTRY
A general category relating to LANGUAGE of the recording:
  ENGLISH, etc.

For an added treat, actual sounds of a real 1947 Voice-O-Graph record booth may be output for realism.

A watermark may be added to the record booth session video stream before presentation to the plurality of listening/watching record booths, thus providing a means for trademarking and/or sponsorship. FIG. 3 shows an exemplary user interface operating on a Smartphone, e.g., an iPhone, in accordance with the principles of the present invention.

Presentation of Record Booth Sessions

Figure 4:
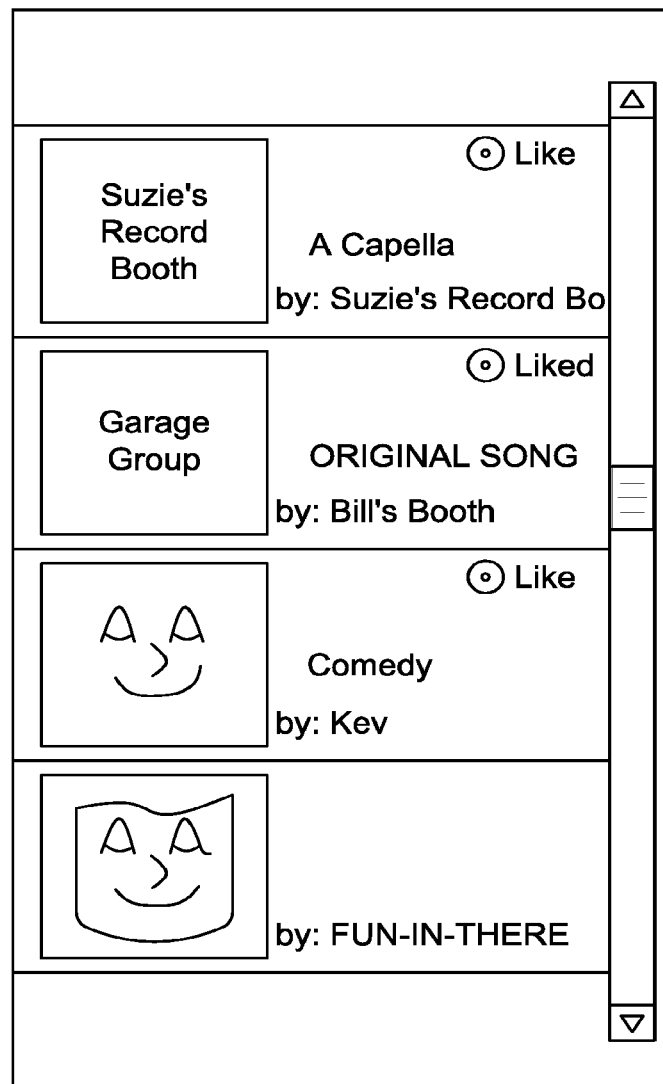
FIG. 4 shows an exemplary user interface to present a scrolling list of currently live record booth sessions from which to select for listening/watching, in accordance with the principles of the present invention.

FIG. 4 shows an exemplary user interface to present a scrolling list of currently live streams of record booth sessions from which to select for listening/watching, in accordance with the principles of the present invention.

In particular, as shown in FIG. 4, all current record booth sessions are presented for listening (or viewing) in a suitable streaming channel, selected by a listening/watching record booth, e.g., by use of a scrolling list. A short audio clip of a currently presented record booth session on a given streaming channel may be sampled to aid in the selection. For instance, while a touch screen is contacted in an appropriate area, audio from a designated streaming channel may be played, and ceased upon lifting of the touch on the touch screen. Alternatively, sample audio may be output while executing a deep press on a suitably capable touch screen. If bandwidth permits, sample video may be provided with the sample audio.

Current record booth sessions may be categorized first, then presented on a suitable streaming channel based on their category. Categorization may be input by the user, or in the future automated in some way (distinction between instrument v. a cappella, singing v voice, etc.)

Exemplary categories input by the user may include input the name of a contest category. Contests may be run in any frequency, including once a month, week, day, hour, etc. A contest access code may be implemented to limit entries from any given record booth.

Preferably, the streaming channels present to a listening/watching record booth live record booth sessions, queued one after another, at the end of a currently playing live record booth session. If any record booth session has ended early, or otherwise includes a significantly long silent or blank section, that record booth session may be automatically sensed by the record booth server to terminate the playing of a current record booth session, and start playing of a next-queued record booth session, e.g., after 4 seconds of essentially silence.

As the number of queued live record booth sessions increases, additional streamed channels may be added for selection by listening/watching record booths. The wireless record booth is preferably notified of an identity of a streaming channel, and queued position therein, of when their live record booth session will be played.

A configurable option is to display an exact, or approximate, number of currently listening/watching record booths in total running at that time, and/or a number of listening/watching record booths listening or watching any given streaming channel. The number of currently listening/watching record booths overall, and with respect to each streaming channel, may be displayed for both the recording record booth as well as for the listening/watching record booth. For the recording record booth, preferably the displayed number of listening/watching record booths relates to those listening or watching the streaming channel that the resulting record booth session being is injected into.

Users can 'favorite' record booth names on their listening/watching record booth so that when that 'favorited' record booth appears in any available streaming channel, the listening/watching record booth will automatically switch to that channel carrying their 'favorite' record booth as it begins (preferably a configurable option). In this way, a given listening/watching record booth will be able to listen to/watch all record booth sessions from 'liked' record booths.

If the listening/watching record booth is not currently active, yet a record booth session with 'favorite' status is about to be played, the wireless device is preferably provided with an out-of-band message such that a text message, tweet, or other notification suggesting that the record booth app be started to hear/watch the upcoming record booth session. Ideally a link is provided with the out-of-band message such that the record booth app may be started and steered to play the 'favorited' record booth session with a single click.

In other embodiments, the listening/watching record booth may be able to navigate within the record booth app to view a list of any upcoming record booth sessions of 'liked' record booths.

Audio only of default streaming channel may be streamed live to those who select it, for more passive listening. Preferably, a button is presented to switch to video mode as desired within the listening/watching record booth, then another button to switch back to audio only.

Selection of a streaming channel on any given listening/watching record booth may be configured to automatically switch to a streaming channel playing a higher/highest rated record booth session. The automatic selection may preferably utilize, e.g., a last rating of a given record booth session from the relevant record booth, an average of a plurality of recent ratings, etc.

Individual Artistic Effects

Record Booth "Skins"

The record booth user interface may emulate any of a plurality of different style vintage record booths. For instance, the disclosed embodiments utilize a record booth "skin" that emulates or evokes an actual 1947 model of the Voice-O-Graph record booth. However, the user interface may present a visual record booth "skin" that emulates or evokes an actual 1957 model of the Voice-O-Graph record booth. Or that emulates or evokes an actual 1960s model of the Voice-O-Graph record booth. Or that evokes an imaginary model of the Voice-O-Graph that was not actually manufactured.

If a different model of the Voice-O-Graph is chosen as the user interface to the hosting wireless device, preferably new mechanism animation associated with that different model of the Voice-o-Graph is visually (and perhaps audibly to include a dropping of the record, etc.) presented to the display of the wireless Record Booth.

Video Effects

Visual software filter effects may be added to the video of the live record booth session to add any of a plurality of effects to the video. In a preferable embodiment, each, or all, video effect filters may be purchased from the record booth server, or suitable other server or App store, for addition to the relevant wireless device record booth.

For instance, a video filter may be selected that filters the record booth session as a resulting video stream that appears to have been filmed with 35 mm film; or with a vintage film camera; or through a fisheye lens; or to have a sunburnt look; or hot color content; an aged film look; etc. Another video filter preferably renders the video to appear as though it is being played on a 1940s style TV (e.g., black and white, rounded CRT edges, rastered, etc.). The look of other model TVs may also be provided as a video filter, e.g., as a 1960s early color TV (film noir/sound noir, less rounded edges, rastered). A Technicolor/Technisound video/audio filter combination may be associated with a 1970s style TV.

Preferably, as an aid to selection of a particular video filter, the user is provided with an image from the front-facing camera on their smartphone (e.g., iPhone) using a contemplated video filter as they are selecting the given video filter.

Audio Effects

Different microphones, cutting heads, and even cutting styluses may be selected in a desired combination to emulate a different audio effect. For instance, a bullet harmonica microphone may be selected with limited frequency cutoff response of about 5,500 Hz, or a high fidelity mic such as a 1950s Elvis style microphone may be selected with a particular 16,000 Hz frequency cutoff response point, or any other microphone in between. Ideally the actual frequency response curves of the selected microphone are applied against the audio as a filter. Additional microphone selections may be made available as a premium service, or purchased via interaction with the record booth server or suitable app store.

Additional audio filter options may include a choice of modern HD/5.1 Dolby Digital sound.

Similarly, different cutting heads may be emulated in sound style, with differing frequency capabilities. Additional cutting head selections may be a premium service, or purchased via interaction with the record booth server or suitable app store.

Record surface noises or other subtitles may be added as an audio effect via selection of a particular style cutting stylus. For instance, a steel-style cutting stylus may be selected, with appropriate surface noise and responsiveness emulated in the audio recording. Or a ruby cutting stylus, with an emulation of better audio results, or even a tungsten wedge or cone cutting stylus, with emulation of commensurate audio results.

Stylus effects may be added by overlaying an audio track of a given cutting head and/or stylus created by cutting silence into a given record medium, e.g., cutting into a given plastic record, dub plate, or wax. Preferably, the overlayed audio track is randomized for each use so that the same surface noises don't occur at the same point in all record booth sessions utilizing that effect. For instance, the overlayed audio track may be started at a random point for each use, or otherwise seeded with a random seed value. In another embodiment, samples of actual blank surface recordings may be randomly mixed and blended into the audio track to appear random.

Moreover, the record medium may be selected by the record booth user to fine-tune the audio effects such as stylus effects.

In a preferable embodiment, each, or all, video effect filters and audio effect filters may be purchased from the record booth server, or suitable other server or App store. When used in different combinations, the video filters and audio filters result in hundreds of different combination possibilities, adding to a unique expression of a record booth session made in a given wireless device record booth.

Preferably, as an aid to selection of a particular combination of audio elements (i.e., filters), the user is provided with a sample audio output from the speaker of their wireless device record booth as they are contemplating a particular audio filter combination.

Ideally a default video/audio filter combination is provided for a given record booth of a particular type. As additional record booth filter combinations are purchased, the associated video and audio filters become available to the user for mixing and matching to create customized effects.

For instance, the microphone, cutting head and cutting stylus similar to those originally found in a 1947 Voice-O-Graph record booth may ideally be provided by default. Additional filter combinations associated with the 1957 Voice-O-Graph record booth, and with the 1960s Voice-O-Graph record booth, may be added as a purchased premium item. With the audio and video filter combinations included with each of the 1947, 1957 and 1960s Voice-o-Graph record booth, the user of the wireless device Record Booth may mix and match prior to initiation of a given Record Booth session, and have that mixed-and-matched combination applied for all future Record Booth Sessions until changed.

Preferably, particularly as the mix-and-match combination varies from any of the pre-combined filters for the 1947, 1957 or 1960s Voice-o-Graph, an easy single-selection to bring the user back to the home or default filter combination for a given model Voice-o-Graph (e.g., for the 1947 Voice-O-Graph) is also provided.

An exemplary combination of video and audio filters to emulate use of the 1947 model Voice-O-Graph may include a record booth skin of an actual 1947 Voice-O-Graph, an audio filter associated with a 78 rpm 3 mil stylus, and a low end magnetic cutting head, with a video filter associated with a 1940s style TV.

Metadata

Preferably, the stored video (or audio) record booth session files include in metadata a record of any/all video and audio options used, including the record booth skin selected, all audio filters used, and all video filters used.

Streaming of Record Booth Session

The record booth server preferably makes use of a streaming engine, e.g., a WOWZA(™) streaming engine.

Alternatively, the record booth sessions may be presented via an established streaming media mechanism. For instance, the record booth sessions may be presented to the masses, e.g., using an established video streaming service such as PERISCOPE™, www.twitch.tv, etc. Record booth sessions are streamed on one or more channels. Separate streaming channels may be established based on category of music style, geographic location, language, etc. Additional streaming channels may be subject related, such as 'open mike' with record booth sessions relating to topics of the day, a specific social event such as a Graduations, Blue Star Heroes for a video stream of greetings to a soldier overseas on deployment, etc.

Other use of category may be implemented within the principles of the present invention. For instance, the category may be freely defined by those mobile device record booths when recording a record booth session. The category may, if desired, include a prefix to the category, e.g., "vogTodays Debate", with "vog" being the prefix. Or a designated keyboard character may be used such as &TodaysDebate, or ^TodaysDebate. Within a channel such as Graduations, a category specific to a particular school may be set by any user and mirrored by other users wanting their record booth sessions to be joined in the video same category-specific video stream. Thus, within a Graduations channel, a user may set/define a new category called ^BCCHighSchool, and all record booth sessions carrying that same category will be included in the video stream for Graduations/^BCCHighSchool. In this way, a continuous uninterrupted video stream of record booth sessions each of limited length (e.g., 65 seconds) can be enjoyed of various graduates saying what they will miss most about their time at the school, etc. A download may be made available of the entire video stream, as of a given specific time such as when the ^BCCHighSchool category expires (e.g., after 7 days; after 30 days, etc.) Similarly, if the channel is Blue Star Heroes, a category specific to a particular soldier such as ^LiamBarry may be set by any user, and mobile device record booths may record their own unique record booth sessions into that channel and category, and have their greetings to Liam Barry concatenated into a continuous video stream for entertainment of Liam and all.

When setting the category for a record booth session, the record booth mobile device may prompt with current categories within the selected channel. The current categories may be presented in currently trending order. Preferably a search bar is provided by the mobile device record booth to enable search for a current category. Alternatively, the mobile device making a record booth session may define a new category within the selected channel.

The record booth mobile device in watching mode provides a selection of channel, and within the channel the ability to turn category filtering ON or OFF. If category filtering is OFF in watching mode, all record booth sessions within the selected channel are available for placement in a video stream to the mobile device record booth. If category filter is ON in watching mode, record booth sessions are further filtered to only those that meet the selected category.

The record booth sessions network may be global.

Social Network Rating

Figure 5:
FIG. 5 shows an exemplary screen shot of a live record booth session being watched at one of a plurality of listening/watching Smartphone devices, in accordance with the principles of the present invention.

FIG. 5 shows an exemplary screen shot of a live record booth session being watched at one of a plurality of listening/watching wireless device (e.g., smartphone devices such as an iPhone), in accordance with the principles of the present invention.

In particular, as shown in FIG. 5, record booth sessions are preferably passively and/or actively RATED by the watching and listening public.

Passive rating may be calculated by any suitable manner, e.g., as a measure of the number of record booths who have watched the sourcing record booth, a length of time that record booth sessions have been watched from a given record booth, etc.

The number of listening/watching record booths at a time when a given record booth session is streamed also adds to a passive rating for a given record booth session. For instance, an increase in a number of listening/watching record booths achieved from start to finish of a given record booth session adds proportionately to a rating for that given record booth session. Similarly, a decrease in a number of listening/watching record booths achieved from start to finish will detract proportionately from the rating for that given record booth session.

Active rating may be implemented via 'gold records' (i.e. 'likes') attributed by listeners and watchers. The active rating may be obtained both from a number of 'gold records' or 'likes' attributed to a sourcing record booth, as well as to a number of 'gold records' or 'likes' attributed to the specific record booth session being watched as it is being watched.

The active rating is preferably dynamic, tallying 'votes' from all sources as the record booth session is played live, such that as a particular great record booth session is being watched, a flurry of positive ratings may cause listening/watching record booths (configured to accept such switching based on rating) to switch to the streaming channel carrying that record booth session.

Alternatively, or additionally, other social media may be utilized for active rating, e.g., TWITTER™ with a specific hashtag including an identity of a specific record booth session and/or its sourcing record booth.

Preferably a visual icon is presented on the user interface of the watching/listening record booth for easy single-touch rating either directly to the record booth server, or via an external social media source such as via TWITTER™.

A play list of video streams selected and played on the wireless device record booth is maintained, together with icons to enable single-click rating before and after the relevant video stream was viewed/listened to on that wireless device. Preferably, after a given wireless device has rated a given video stream, the voting icon is disabled for that wireless device to vote any more on that given video stream. Disabling of the rating icon may be indicated in any suitable manner, e.g., by disappearing or by dimming substantially.

"Best oF" Hour

Highest rated record booth sessions are queued for re-presentation in a more special forum, for instance, a 'Best Of' hour each evening with the 65 seconds (or even shorter clips, e.g., 30 second clips) of the highest-rated record booth sessions over, e.g., the past 24 hours.

The 'Best Of' re-presentation of the best live record booth sessions may be reformatted for presentation on a large screen, for display in a lounge, living room, etc. Authorization for re-presentation is preferably obtained from the user of the record booth upon initial upload when the record booth app is first installed.

Rewards may be implemented to credit the account of certain record booths. For instance, a credit of a given amount may be made to the account of a given record booth upon being selected for inclusion in a "Best Of" hour or the like.

Group Record Booth Session

The present invention can be implemented to permit a plurality of users the ability to be grouped together in a common virtual record booth, online and connected together, with each having their own wireless record booth app recording synchronously at the same time into a common live video and/or audio stream. One of the record booths is designated as the controlling record booth, providing payment to start the record booth session, for association of the record booth name with the video and/or audio stream, etc.

Invitations to other wireless device record booths are preferably initiated from the controlling record booth, and accepted by the accompanying record booths. The live video and/or audio stream of the resultant record booth session is uploaded to the record booth server by the controlling record booth.

The user interface of each accompanying record booth (i.e., all users that are "in the booth") is started by the controlling record booth, with timing signals, etc. synchronized among all participating record booths.

E-Record Greeting

A wireless record booth may optionally send a virtual vinyl record (i.e., an e-record) to any one or more designated email address(es). Similar to an e-greeting card, a designated recipient need not be a wireless record booth, but preferably the e-record includes a link to download the record booth app should the recipient not already have the record booth app loaded on the receiving wireless device.

The e-record is preferably an audio file in any suitable compressed format, e.g., MP3, etc. Metadata preferably includes an image of a vintage Voice-O-Graph type record, and/or vintage record booth. Alternatively, the recipient may receive a link to download the audio or video file associated with the record booth session sent as an e-record greeting.

On Location Life Size Record Booths

Figure 6:
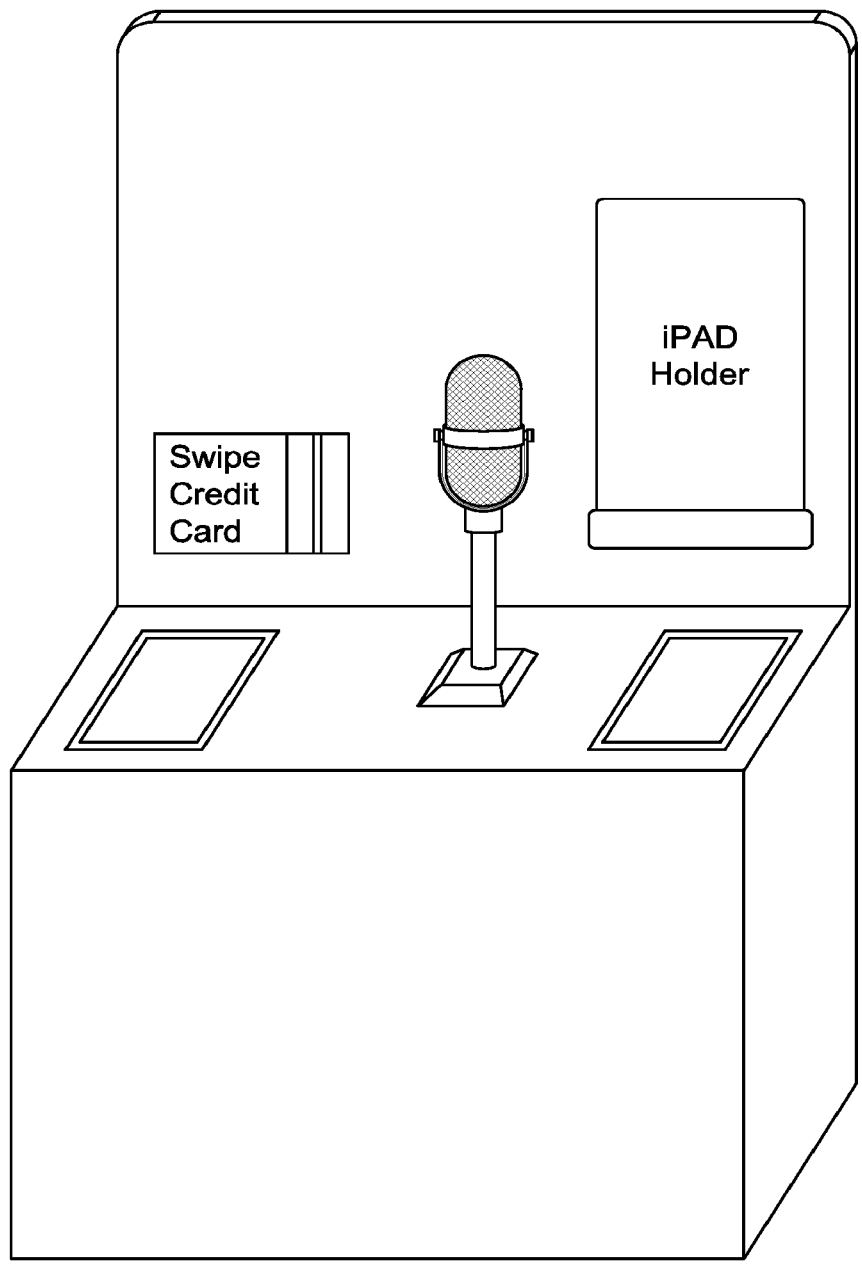
FIG. 6 shows an exemplary life-size record booth built in a style, e.g., of a 1947 Voice-O-Graph record booth, in accordance with the principles of the present invention.

FIG. 6 shows an exemplary life-size record booth built in a style, e.g., of a 1947 Voice-O-Graph record booth, in accordance with the principles of the present invention.

In particular, life size replicas of the cabinet of a vintage Voice-O-Graph record booth, e.g., the 1947 model Voice-O-Graph record booth, may be built and put on location at select record stores, etc. Preferably the vintage replica record booth shell has a dedicated iPad with the record booth app running. An external microphone installed in the replica record booth may be used instead of the mic integrated within the wireless device used to host the record booth app. A physical instruction backglass may be implemented in the replica record booth, with signaling of actual light bulbs behind which being controlled by signalling from the record booth app running on the iPad or the like. External coin drop or credit card input may also be implemented and interfaced with the iPad running the record booth app.

The present invention is applicable to social networks in general. The invention lends itself to provide a venue for a contest for crowning a best record booth session.

The present invention provides a record booth session network in a way which provides numerous points for revenue generation, ensuring both a thriving social network for record booths, as well as income sufficient to sustain the costs of the network required to provide such a social network. For instance, revenue generating points for those recording a record booth session include, for example, a cost to the initial download and installation of a record booth application; a fee to record a record booth session (e.g., a 25c token fee, billed monthly.) Longer length record booth sessions may be purchasable (e.g., 50c for 2:10, etc.) A plastic record may be made from the live record booth session, and mailed to the user.

For those who only listen and watch others' recording booth sessions, access to video of record booth sessions may be provided to premium services members who pay a monthly fee, whereas audio may be provided free to all. Also, advertising revenue may be generated with watermarks injected into the record booth session.

Any required copyright licenses may be built into price, e.g., jukebox license, streaming engine license, etc.

Record Booth Social Network

Features and Requirements

The record booth app creates a social network wherein 65 second fair use sessions of all app users are streamed LIVE for the masses (per authorized agreement upon initial installation of the Record Booth app in the user's phone).

The Record Booth app provides an opportunity (for those who step into their own personal wireless device record booths) to be heard and/or watched in a social network environment!

The Record Booth provides numerous points for revenue generation, ensuring both a thriving social network for those recording in the record booth, as well as income sufficient to sustain the costs of the network required to provide such a social network to those watching others recording.

Revenue generating points for those recording a record booth session include, for example, a cost to the initial download and installation of a record booth application; a fee to record a record booth session (e.g., a 25c token fee, billed monthly.) Longer length record booth sessions may be purchasable (e.g., 50c for 2:10, etc.) A plastic record may be made from the live record booth session, and mailed to the user.

Revenue generating points for those who only listen and watch others' recording booth sessions may include on-demand access to past video of record booth sessions may be provided to premium services members who pay a monthly fee. (i.e., LIVE is free, on demand is premium)

Advertising revenue may be generated from watermarks injected into the video watched by others.

Any required copyright licenses may be built into price, e.g., jukebox license, streaming engine license, etc.

All configurable options are controlled by a server so that premium services can be enabled, etc.

The Record Booth lends itself to viral growth, particularly in conjunction with contests to crown a best record booth session.

Initial Installation

Most, if not all, installation values are given a default so that the user can immediately skip entry and use the record booth right away.

Each Record Booth app is uniquely named by the phone owner. If a name is already within a database at the record booth server, the input name is rejected and a prompt is provided for another name.

A default unique name is provided automatically, until the user takes the time to change the record booth name to something they prefer. Suggestion is to use a numbering system such as: "RBxxxxxxx".

Famous names, trademarked names, etc. are individually verified and indicated to listeners as being certified, e.g., using a check mark aside the record booth name, etc.

Login credentials, upon initial installation, record booth name created, checked for uniqueness at the server. Password protected. name and password are remembered and not asked again.

Record booth settings are maintained in a profile, stored locally. Up to 10 profiles may be saved.

User accepts authorized agreement to permit streaming of record booth session, upon initial installation of the Record Booth app in the user's phone.

All users are given an initial pile of TOKENS with installation of Record Booth app. Specific number is configurable, set to say 10 tokens initially.

Main Page

Depicts an image of a 1947 Voice-O-Graph record booth to one side, and an image of a stack of Voice-O-Graph records next to one on a record player on the other, with a visual to invite selection of either RECORDING STUDIO mode (by touching the image of the record booth), or selection of RECORD PLAYER mode (by touching the image of the record player).

A small Record Booth logo is located in the bottom of the image, in the middle. When selected, you enter the fine print page that lists the REVISION NO of the app, and links to:
About Us:
Check for Update:
Terms of Use:
Privacy Policy:
FAQs:
Social Network sites (facebook, twitter)
Contact Us:
Advertising Inquiries:

Recording Studio Mode

The GUI of the RECORDING STUDIO mode of record booth is a functional depiction of the inside of a particular model of the Voice-O-Graph record booth, e.g., the inside of the 1947 Voice-O-Graph record booth.

Quick use of the Record Booth app by a first-time user is to be facilitated, meaning that the app starts up with defaults sufficient to enable a new user to see it work right away.

If initiation information is missing, an icon asking user to input information (like naming their record booth, etc.) is requested BUT NOT REQUIRED TO PROCEED.

A gear is depicted as an icon for selection by user to enter an ARTISTIC EFFECTS page (see herein below)

The number of tokens remaining is shown visually in GUI, near the coin entry of the record booth, and is reduced by one for each use of the record booth.

If NO TOKENS remaining, when the user attempts to ENTER RECORD

BOOTH, a PURCHASE TOKENS page is instead presented.

Purchase Tokens Page

Only entered if no tokens remain.

Prompted input of payment method (PAYPAL or credit card). Information stored locally only (not on record booth server).

Token price is configurable, initially set to $0.25 each.

Option to bill purchased tokens monthly.

Sub-page to show ACCOUNT information, and payment history

Enter Record Booth

The record booth user interface importantly uses the front-facing camera of the phone to video record the record session. Thus, the video image will typically be of one or more persons singing or speaking in front of the wireless device record booth.

The LENGTH of the record booth session is configurably set (by the admin). Default is 65 seconds. Longer time possible for premium users.

Optional Data Input

A shadowed area at bottom of record booth image is provided, with "TITLE" lightly printed therein (image of booth is seen through the box) to enable the user to type in a name for the session. A reasonable but limited number of characters permitted (e.g., 64?), scrolls to left as you get to end of box.

A translucent CATEGORY wheel shown just below the name, with present choices. Language is English by default, if selected, many other languages provided as an option, which then replaces the choice of "English" on the category wheel thereafter, until changed. Default is A CAPELLA. Initial categories (configurably changed by admin) include, e.g.:
A CAPELLA
W/INSTRUMENT
SPEAKING
COMEDY
ORIGINAL SONG
Sub-categories may include, e.g.:
   ALL/general
ROCK
POP
COUNTRY
A general category relating to LANGUAGE of the recording: ENGLISH, etc.
MONTHLY CONTEST ENTRY
Start To start the record booth, the user preferably taps a visual depiction of a coin slide or coin entry plate in the graphical user interface showing the inside of a 1947 Voice-O-Graph record booth to 'insert coin' and start the record booth.

Once started, the record booth cannot be stopped. If app is closed during a record booth session, token is lost.

The record booth visually depicts an animation (or actual video) of a view through the viewing port of a record blank being loaded onto the turntable of the relevant model of Voice-O-Graph record booth. The perspective of the displayed image shifts to one looking down into the viewing port. Animation can be eliminated (by configuration).

The record blanks are shown as a black blank disk with a label. Default is black. Options are clear, or any basic color. Label on record is an image, configured by admin, to permit corporate sponsorship.

Actual sounds of a real 1947 Voice-O-Graph record booth may be output for realism during the animation. (configurable on/off)

Visual signals light in sequence on the depicted instruction "backglass" of the user interface displayed on the display screen of the wireless device, similar to the signaling in a real 1947 Voice-O-Graph recording studio, including:
"STUDIO IN OPERATION" lights when token entered.
"GET READY" arrow lights as the record blank is being loaded;
"65 SECONDS TO GO" lights at start of record booth session.
Also, a red RECORDING WHEN LIT light is illuminated when the record booth session starts, and stays lit until end of record booth session.
"30 SECONDS TO GO" light;
"WARNING, 10 SECONDS TO GO" light;
"STOP! RECORDING COMPLETE" light.

Record booth sessions are 65 seconds in length.

As an additional guide, a nixie tube countdown clock is shown above the RECORDING WHEN LIT light, starting at "1:05" and counting down to "0:00".

After recording the record booth session, that recording record booth preferably displays a queued position, or approx. time to live presentation on a given presentation channel, indicating approximately when the record booth session will be played live to other users.

Post Recording

The record booth session is a LIVE video stream uploaded to the Record Booth server—not stored locally on the wireless device then significantly later uploaded by the user. To the extent that the live video stream must be buffered/stored locally for a short period of time while or just before upload to the Record Booth server, the buffer/storage is made invisible to the user and occurs entirely in the background. A significant delay is avoided between the recording of the record booth session, and upload to the record booth server.

Audio only of the record booth session is saved locally to an audio file (with ICON inserted into metadata as if an album cover), such that it may be located along with other music on their handset, and later played back whenever they want, serving as a record booth session playback function.

After completion of recording, a prompt is presented to the user interface asking if they want a 45 rpm record made. If so, they are taken to MAILED 45 rpm RECORD page.

Mailed 45 rpm Record Page

Appropriate payment is made via PAYPAL or cc. Since cc and PAYPAL information is locally stored, it is pre-filled in.

Input boxes for billing address (if cc) and mailing address. For efficiency, a last-entered mailing address is pre-filled in for the user to confirm.

Artistic Effects Page

Record Booth "Skins"

The record booth emulates any of a plurality of different style vintage record booths. Default record booth 'skin' that emulates the look of an actual 1947 model of the Voice-o-Graph record booth.

Alternative 'skins' may be chosen, such as a 'skin' that emulates or evokes an actual 1957 model of the Voice-O-Graph record booth. Or that emulates or evokes an actual 1960s model of the Voice-O-Graph record booth. Or that evokes an imaginary model of the Voice-O-Graph that was not actually manufactured.

With each different skin includes new mechanism animation associated with that different model of the Voice-o-Graph.

Video Effects

A visual software filter effect may be selected. Availability of filters is configurable (and likely a premium service)

Selected visual software filter is applied against the live video to add the relevant visual effects to the video. (UP TO PROGRAMMER is whether the visual filter is applied at handset, or at record booth server.)

Default may be NO visual filter. Video effect filters may be configured for purchase from the record booth server, or suitable other server or App store.

Currently envisioned video filters include:
a resulting video stream that appears to have been filmed with 35 mm film;
or 8 mm film
or through a fisheye lens
or to adjust colors to have a sunburnt look
or to adjust colors to have a watercolor look
or to adjust colors to be hot or over saturated
or to adjust film to have an aged look
or to appear as though video is being played on a 1940s style TV (e.g., black and white, rounded CRT edges, rastered, etc.)
or to appear as though video is being played on a 1960s early color TV (film noir/sound noir, less rounded edges, rastered).
or to appear as though video is being played on a 1970s TV (to have a Technicolor appearance—may go with Technisound To aid selection of a particular video filter, the user is provided with an image from the front-facing camera on their smartphone (e.g., iPhone) using a contemplated video filter as they are selecting the given video filter.

Video filters are configurable, and may be a premium service, or purchased as a separate item via interaction with the record booth server or suitable app store.

Audio Effects

An audio software filter effect may be selected. Availability of filters is configurable (and likely a premium service.)

Selected audio software filter is applied against the live audio to add the relevant audio effects to the video. (UP TO PROGRAMMER is whether the audio filter is applied at handset, or at record booth server.)

Default may be NO audio filter. Audio effect filters may be configured for purchase from the record booth server, or suitable other server or App store.

Currently envisioned audio filters include:
Microphone
Selection of a type microphone having known frequency characteristics. (For purposes of the record booth app, for now differences between the volume output by different microphones is ignored.) E.g.:
bullet harmonica mic with cutoff freq of about 5,500 Hz
1920s Elvis style mic with cutoff freq of about 16,000 Hz The actual frequency response curves of the selected microphone are applied against the audio to produce the desired audio filter.

Cutterhead

Selection of a type cutterhead having known frequency characteristics. E.g.:

1940s Shure magnetic cutterhead
1920s Astatic magnetic cutterhead
1920s B. B. C. Grampian cutterhead The actual frequency response curves of the selected cutterhead are applied against the audio to produce the desired audio filter.

Cutting Stylus

Record surface noises or other subtitles are added as an audio effect via selection of a particular style cutting stylus. For instance, a steel-style cutting stylus may be selected, with appropriate surface noise and responsiveness emulated in the audio recording. Or a ruby cutting stylus, with an emulation of better audio results, or even a tungsten cutting stylus, with emulation of commensurate audio results.

Stylus effects may be added by overlaying an audio track of a given cutting stylus. The overlayed audio track is randomized for each use so that the same surface noises don't occur at the same point in all record booth sessions utilizing that effect. For instance, the overlayed audio track may be started at a random point for each use, or otherwise seeded with a random seed value. If possible, samples of actual blank surface recordings may be randomly mixed and blended into the audio track to appear random.

Default is no selection of cutting stylus such that the audio is not filtered. Options include:

steel stylus;
ruby stylus
tungsten stylus

All audio filters are configurable, and may be a premium service, or purchased as a separate item via interaction with the record booth server or suitable app store.

When used in different combinations, the video filters and audio filters result in hundreds of different combination possibilities, adding to a unique expression of a record booth session made in a given wireless device record booth.

As an aid to selection of a particular combination of audio elements (i.e., filters), the user is provided with a sample audio output from the speaker of their wireless device record booth as they are contemplating a particular audio filter combination.

A default video/audio filter combination is provided for a given record booth of a particular type. As additional record booth filter combinations are purchased, the associated video and audio filters become available to the user for mixing and matching to create customized effects.

For instance, the microphone, cutting head and cutting stylus similar to those originally found in a 1947 Voice-O-Graph record booth are provided by default. Additional filter combinations associated with the 1957 Voice-O-Graph record booth, and with the 1960s Voice-O-Graph record booth, may be added as a purchased premium item.

With the audio and video filter combinations included with each of the 1947, 1957 and 1960s Voice-o-Graph record booth, the user of the wireless device Record Booth may mix and match prior to initiation of a given Record Booth session, and have that mixed-and-matched combination applied for all future Record Booth Sessions until changed.

As the mix-and-match combination varies from any of the pre-combined filters for the 1947, 1957 or 1960s Voice-o-Graph, an easy single-selection to bring the user back to the home or default filter combination for a given model Voice-o-Graph (e.g., for the 1947 Voice-O-Graph) is also provided.

An exemplary combination of video and audio filters to emulate use of the 1947 model Voice-O-Graph includes a record booth skin of an actual 1947 Voice-O-Graph, an audio filter associated with a 78 rpm 3 mil stylus, and a low end magnetic cutting head, with a video filter associated with a 1940s style TV.

Metadata

The stored video and audio files of the record booth session include in metadata a record of any/all video and audio options used, including the record booth skin selected, all audio filters used, and all video filters used.

A visual LINER NOTE/ICON (one sided), if uploaded through the record booth, is displayed as an ICON on the watchers screen during AUDIO ONLY presentation, and/or used as an icon when watchers are searching ON DEMAND selections.

The same ICON is used thereafter, and associated with all record booth sessions from the relevant record booth, until changed.

Group Record Booth Session

A plurality of wireless device record booths may be grouped together in a common virtual record booth, online and connected together, with each having their own wireless record booth app recording synchronously at the same time into a common live video and/or audio stream.

One of the record booths is the initiating record booth, providing payment to start the record booth session, etc. Same price as for a single person in the record booth, but capability is configurable (and likely a premium service.)

The initiating record booth outputs invitations to other named wireless device record booths. The user inputs the name of any/all other participant record booths.

When a recipient of an invitation accepts the invitation, their audio is mixed with the audio in the initiating record booth (and also output for the user to hear).

The user interface of each accompanying record booth (i.e., all users that are "in the booth") is started by the controlling record booth, with timing signals, etc. synchronized among all participating record booths.

E-Record Greeting

A wireless record booth may enter an optional E-RECORD GREETING page in which E-RECORD GREETING option is chosen (configurable option), and up to 6 recipient record booths are identified. Recipient record booths are presented with a notification of the E-record greeting, both the next time they enter the RECORD PLAYER mode, but also out-of-band via text.

Email delivery of the audio file is presented as an option.

Similar to an e-greeting card, a designated recipient need not be a wireless record booth, but preferably the e-record includes a link to download the record booth app should the recipient not already have the record booth app loaded on the receiving wireless device.

The e-record is an audio file in any suitable compressed format, ideally MP3.

Metadata included with the e-record greeting includes the ICON provided by the record booth, if available. If not, the metadata includes an image of a vintage Voice-O-Graph type record.

Record Player Mode

Main Page

Record Player mode is an easy, passive, continuous experience where a default video stream is immediately presented to the user, to immediately engage them. Thus, the record player main page jumps directly into a full screen default streaming channel (e.g. a streaming channel looping the "BestOf" hour).

SWIPE RIGHT on record player main page to jump to the MATRIX SELECTION page.

SWIPE LEFT on record player main page to jump to the ON DEMAND search page.

For all modes: When new full screen stream started, translucent "[category] [title]" appears over video in translucent white text, and fades out. E.g., Rock "Bethesda Blues from My Garage" or Original Song Queequay Video stream is to be full screen, with AUDIO/VIDEO toggle,VOLUME, and "[category] [title]" appearing translucently on top after screen is tapped (and disappearing after screen tapped again). (feature available on all pages where video/audio is presented.)

The specific categories of currently live video streams presented for choice by the user is DYNAMIC, and can be changed at any time by the admin of the record booth server.

If AUDIO/VIDEO toggle is set to video, the streams are downloaded to handset as video; If AUDIO/VIDEO toggle is set to audio only, the streams are downloaded to handset as audio only; If AUDIO/VIDEO toggle setting is changed from video to audio, the audio begins immediately for the currently playing stream (without waiting to rebuffer an audio only file)

Preferably, the AUDIO continues to play as the wireless device is navigated to other non-audio apps, e.g., email, etc.

Play List

A play list of video streams selected and played on the wireless device record booth is maintained, together with icons to enable single-click rating before and after the relevant video stream was viewed/listened to on that wireless device. Preferably, after a given wireless device has rated a given video stream, the voting icon is disabled for that wireless device to vote any more on that given video stream. Disabling of the rating icon may be indicated in any suitable manner, e.g., by disappearing or by dimming substantially.

Matrix Selection Page

Swipe right from record player main page to get to Matrix selection page; swipe left to return to record player main page (if not automatically returned upon selection of full screen video stream).

A MATRIX page is provided where up to 12 video streams are shown together as a matrix. This is streamed as a single video to the handset. One tap on any portion of the screen attributed to a given video lets audio from that selected video stream play to the user, while video stream remains the matrix. Two taps (or long press) and that video stream is selected and goes full screen.

The number of video streams in the matrix is configurable by admin, from 2 to 12.

Over each video stream in the matrix, the CATEGORY is written (white text, translucent) (enable/disable configurable by user.)

Over each video stream in the matrix, the NUMBER of current watchers of each stream is written (yellow text, translucent) so that a popularity of all video streams shown in the matrix may be observed (enable/disable configurable by user.)

In an alternative embodiment, the currently highest rated stream is outlined in, e.g., a red border, or otherwise highlighted.

On Demand Page (Configurable Access)

Left swipe from record player main page to get to On Demand page; swipe right to return to record player main page (thus returning to the previously selected live stream).

On-Demand search of past record booth sessions.

A default is to search ALL record booths (your own and others), or select to search only your own past record booth sessions Search criteria (dropdown search menu):
Name of record booth
Title
Category
Date recorded
Location If toggle is set to video, the on-demand streams are downloaded to handset as video.

If toggle is set to audio only, the on-demand streams are downloaded to handset as audio only.

If a custom ICON image file was uploaded by the recording record booth, that ICON is presented as an album cover, along with record booth name, title, and any other meta data input by recording record booth, as an aid to searching.

Record Booth Server/Cloud

All current record booth sessions are presented for listening (or viewing) in a suitable category streaming channel. The particular stream that is downloaded to a particular watching record booth (and whether it is video or audio only) is determined by the particular watching record booth.

The streaming channels present live record booth sessions of a common category, queued one after another, queued in order received by the record booth server.

If any record booth session includes a significantly long silent or blank section (e.g., 5 seconds of silence), that record booth session is presumed to have ended early and is automatically terminated. The next record booth session is started immediately.

Admin Page Provided used to set network configurable parameters
used to add/delete video streams
used to generate statistics report (number of users, number or record booth sessions, number views, etc.)
used to generate users/revenue report over a designated period of time.
used to generate downloads report (number of downloads over a designated period of time)

Super-Admin Page Provided used to configure weighting of ratings factors
used to activate various premium features, and to set pricing.
used to administer software updates
used to create admin users, edit admin passwords
used to configure PayPal payment settings Favorite Record Booths Users can 'favorite' record booth names on their listening/watching record booth so that when that 'favorite' record booth appears in any available streaming channel, the listening/watching record booth will automatically switch to that video stream carrying their 'favorited' record booth as it begins (preferably a configurable option). In this way, a given listening/watching record booth will be able to listen to/watch all record booth sessions from 'liked' record booths.

If the listening/watching record booth is not currently active, yet a record booth session with 'favorite' status is about to be played, the wireless device is provided with an out-of-band message such that a text message, tweet, or other notification (mode and address information is configurable) suggesting that the record booth app be started to hear/watch the upcoming record booth session. A link is provided with the out-of-band message such that the record booth app may be started and steered to play the 'favorited' record booth session with a single click.

A page is provided (right swipe from Matrix selection page) that lists any currently queued record booth sessions of 'liked' record booths. (access is configurable, and likely a premium service)

A page is provided (left swipe from On Demand page) that lists any past record booth sessions of 'liked' record booths currently available 'on demand'. (access is configurable, and likely a premium service.)

'Red Booth' Feature

A page is provided to define a RED BOOTH option (ala RED ZONE Football on TV) whereby a profile is setup to select between all available video streams, and thus enable automatic switching between streams, even mid-session.

Profile option for RED BOOTH: An Enable/Disable option to move to the video stream currently carrying the highest rating record booth session playing. A minimum hysteresis time (configurable by user, default 10 seconds) is built in to avoid quick switches between video streams.

Profile option for RED BOOTH: An Enable/Disable option to move to the video stream currently carrying a FAVORITE record booth's session. Favorite record booth sessions are played in their entirety in RED BOOTH mode. If another favorite record booth's session begins while a first favorite record booth's session is still playing, in RED BOOTH mode the video stream automatically switches to the new favorite record booth's session.

Social Network Rating

Record booth sessions are both passively and actively RATED as they are streamed. (weighting of each factor in rating is configurable by Admin)

The RATING is dynamic, continuously tallying 'votes' from all sources as the record booth session is played live, such that as a particular great record booth session is being watched, a flurry of positive ratings may cause listening/watching record booths (configured in the 'RED BOOTH' mode to accept such switching based on rating) to switch to the streaming channel carrying that record booth session.

The RATING is calculated at the record booth server/cloud.

Passive Rating

Passive Rating FACTOR: The number of record booths watching a record booth session adds to a passive rating for a given record booth session.

Passive Rating FACTOR: A MEDIAN rating is maintained for each networked record booth over a period of time (admin configurable amount of time), which adds to the passive rating.

Passive Rating FACTOR: A delta of the number of record booths watching a particular record booth session from start to finish. For instance, an increase in a number of listening/watching record booths achieved from start to finish of a given record booth session adds to a passive rating for that given record booth session. Similarly, a decrease in a number of listening/watching record booths achieved from start to finish detracts (or at least does not add) to the passive rating for that given record booth session.

Passive Rating FACTOR: A MEDIAN of the past 5 sessions (admin configurable number) from a given record booth.

Passive Rating FACTOR: How quickly a user device indicates a 'like' of a given record booth session after it has started is used as an indication of a user's interest in that record booth session. For instance, if a user device selects 'like' of a given record booth session within the first 20 seconds of play of a 65 second record booth session, that can be used as an indication of extreme 'like', and thus can be an added passive rating factor.

Passive rating FACTOR: The geographic diversity of a universe of user devices that have 'liked' a given record booth session may be used as an indication of broader-range appeal. Thus, available location information may be used to ascertain a geographic distance from the record booth that recorded the given record booth session. For instance, user devices registered as being located in other states other than the state in which the given record booth that made the record booth session, if they have 'liked' a given record booth session, may be taken as a broader range of appeal, and thus may add to the passive rating FACTOR.

Active Rating

Active Rating FACTOR: 'gold records' (i.e. 'likes') attributed by listeners and watchers (multiplied by a configurable parameter if the voting record booth has the voted record booth as a 'favorite')

Active Rating FACTOR: Rating via TWITTER is enabled, using a specific hashtag including an identity of a specific record booth session and/or its sourcing record booth.

Active Rating FACTOR: A visual rating icon is presented on the user interface of the watching/listening record booth for easy single-touch rating when watching a video stream in full screen mode. The visual rating icon is preferably visible in a lower corner of the full screen video.

"Best of" Hour

Highest rated record booth sessions over the past 24 hours are queued for re-presentation in a more special forum, for instance, a 'Best Of' hour assembled each evening, and looped for 24 hours, on a BEST OF stream.

The 'Best Of' re-presentation of the best live record booth sessions may be reformatted for access through a web portal, for display in a lounge, living room, etc. Authorization for re-presentation is obtained from the user of the record booth upon initial installation of the record booth app.

Rewards/payment are made to credit the account of record booths selected for inclusion in a 'BestOf' hour. For instance, a credit of a given amount, or a given number of FREE tokens, may be made to the account of a given record booth upon inclusion in a "Best Of" hour.

Sponsored Contests

In a sponsored contest embodiment, a splash page is shown upon initial startup of the Record Booth app, showing a vintage record booth and a billboard advertising an upcoming or present sponsored contest, e.g., a week-long contest to win a certain prize. From there a user may enter the contest, receive special 'coins' for entry of record booth sessions made therewith into one or more video streams dedicated to contest participants. The Record Booth otherwise enters the 'matrix' view page where a number of streams are shown (and/or contest streams), the stream with current highest rating being outlined in red or other suitable color.

Special coins may be provided or purchased by entrants in the contest. To attract sponsors, revenue from the special coins may be shared with the sponsor of the contest.

In other embodiments, an entrant may purchase as many special coins as desired. Also, in other embodiments, multiple coins may be entered into the record booth to record a longer record booth session, e.g., two coins for 130 seconds, etc. A contestant purchases specially encoded quarters that place record booth sessions paid for with that quarter into a stream dedicated to that contest. The quarters preferably appear in the graphical user interface ((GUI) with contest logo on them.

In one use case, a contest winner receives play of their record booth session (or a professionally recorded song of theirs) on a radio or satellite radio station. The modern take on the talent contest is that the public gets to see the contest sessions, self-filtering with ratings to formulate a best of stream. Built-in Entertainment! Sort of like a miniaturized and modern take on reality talent contests where the public has access to the many thousands of auditions live as they happen, and can watch just the best sessions, or get deeper into watching or listening to some of the other streams if they want.

On Location Life Size Record Booths (Future)

In the FUTURE, life size replicas of the cabinet of a vintage Voice-O-Graph record booth, e.g., the 1947 model Voice-O-Graph record booth, may be built and put on location at select record stores, etc.

Porting of the following signals is to be planned for future use EXTERNAL to the handset:

An external microphone installed in the replica record booth may be input to the phone jack of a handset, and an external speaker in the replica record booth may be output to.

External coin drop or credit card payment (to a local vendor, or input to the physical replica booth) may be accepted via the Internet, from the record booth server instructing the record booth to start.

The instruction backglass light signaling is to be ported via the Internet to an IP address associated with the replica record booth, to synchronize the instruction signals.

While described with respect to certain embodiments, disclosed features may be removed within the principles of the present invention. For instance, in the WATCHING mode, the record booth mobile device may have three pages: LIVE NOW, NEW, and BEST.

The following is an algorithm design specification for an exemplary record booth program in a user device such as an iPhone 6 available commercially from APPLE™, in accordance with an embodiment of the present invention.

What is claimed is:

1. A social entertainment device formed by a non-transitory social entertainment computer program downloaded to a wireless device which when executed by the wireless device operates to output social entertainment media for arranged play on a display of the wireless device using at least one video channel defined by a particular hashtag, the social entertainment device being configured to:
cause push of a notification to at least one of a plurality of other social entertainment devices to announce pending play of a recording from the social entertainment device;
intermittently operate a camera on the social entertainment device to stop-and-start record a live record session for a fixed maximum recorded length of time selectable to have a value of no greater than 65 seconds;
transforming an image from the camera of the social entertainment device for display as a selectable video filter;
transforming video of the live record session by application of the selectable video filter;
associate the recorded live record session for playing in arranged sequence with record sessions of some of the plurality of other social entertainment devices, the recorded live record session having a branded watermark applied thereto;
immediately upon startup of the social entertainment computer program on the wireless device a record session by another of the plurality of other social entertainment devices is played with the branded watermark on the display of the social entertainment device; and
record sessions of a sub-plurality of the plurality of other social entertainment devices are played in arranged sequence on the display of the social entertainment device.

2. The social entertainment device according to claim 1, wherein the social entertainment device is further configured to:
email access to a record session of any of the sub-plurality of the plurality of other social entertainment devices to any email address.

3. The social entertainment device according to claim 1, wherein the camera is a front-facing camera.

4. The social entertainment device according to claim 1, wherein the camera is interfaced to the wireless device.

5. The social entertainment device according to claim 1, wherein the wireless device is a smart phone.

6. The social entertainment device according to claim 5, further comprising a microphone in the smart phone.

7. The social entertainment device according to claim 1, wherein:
the live record session recorded on the social entertainment device is played substantially live on displays of at least one of the plurality of other social entertainment devices that received the push of the notification of the pending live recording from the social entertainment device.

8. The social entertainment device according to claim 1, wherein the social entertainment device is further configured to:
rearrange the arranged sequence of the record sessions of the some of the plurality of other social entertainment devices.

9. The social entertainment device according to claim 1, wherein the social entertainment device is further configured to:
enable a user of the social entertainment device to define a new video channel for play of the record session by creating a new hashtag.

10. The social entertainment device according to claim 1, wherein the social entertainment device is further configured to:
enable a search of currently defined hashtags.

11. The social entertainment device according to claim 1, wherein
the social entertainment device automatically switches the display to a live record session recorded by another of the plurality of other social entertainment devices selected to be a 'favorite' of the social entertainment device, when such another social entertainment device goes live.

12. The social entertainment device according to claim 1, wherein
the particular hashtag is contained within meta data associated with the live record session.

13. The social entertainment device according to claim 1, wherein the fixed maximum recorded length is alternatively selectable to have a value of no greater than 30 seconds.

14. The social entertainment device according to claim 13, wherein the fixed maximum recorded length is alternatively selectable to have a value of no greater than 130 or more seconds.

15. The social entertainment device according to claim 1, wherein the fixed maximum recorded length is alternatively selectable to have a value of no greater than 130 or more seconds.

16. The social entertainment device according to claim 1, further comprising:
transforming audio of the live record session by causing application of at least a selected one of a plurality of audio filters to the live record session.

* * * * *

UNITED STATES PATENT AND TRADEMARK OFFICE
CERTIFICATE OF CORRECTION

| | | |
|---|---|---|
| PATENT NO. | : 11,792,350 B2 | Page 1 of 32 |
| APPLICATION NO. | : 17/562995 | |
| DATED | : October 17, 2023 | |
| INVENTOR(S) | : William Bollman and Kevin Carrico | |

It is certified that error appears in the above-identified patent and that said Letters Patent is hereby corrected as shown below:

In the Specification

At Column 23, Line 53, insert the following paragraphs:
--DESIGN SPECIFICATION FOR RECORD BOOTH USER DEVICE
1 Objective
The Record Booth Application is a new social entertainment network app. Inspired by the vintage Voice-O-Graph record booths, it's a social entertainment network built on the enjoyment of listening and/or watching in on short, fair-use type "record booth" recording sessions (e.g., 65 seconds long as in the vintage Voice-O-Graph record booths). The Record Booth app provides the capability to broadcast recordings within the context of a weekly competition, with each recording being ranked according to its popularity in the entertainment feed, number of views, number of actions in other social networks (e.g., likes, etc.) The best recordings make it into the Day's Best stream, and the best of those into a Week's Best stream, from which the overall best for that week's competition are determined.
At its root the Record Booth app provides not only entertainment for those who listen and/or watch the process, but also pure fun and even opportunity for those who step into the record booth and broadcast their recording. Audio and video filters are provided for selection to artistically flavor the recording (e.g., emulate the sound of a 1940s microphone; the visual look of a 1950s B&W television, a 1960s color television; the added surface sound of a worn vinyl record, etc.)
In the initial splash page shown upon bootup, an image of the weekly sponsor's billboard is shown as if glued inside the door of a vintage record booth. The Record Booth Application has the capability to simultaneously support multiple different sponsors and competitions, e.g., one that is national in scope, and dozens or even hundreds of local competitions. The available competitions may be as large as National or International in scope, or as small and local as an online version of a high school talent show run as a local fundraiser. Nevertheless, each creates a series of broadcast entertainment streams (configurable by the Admin as audio only, or video capable), that the public may watch passively and for no cost.
The Record Booth app is intended to be available as a free download, and the vast majority of users will merely watch and/or listen to any of the broadcast entertainment streams for free. However, numerous revenue points are implemented to generate a stream of revenue. The record booth takes a Signed and Sealed this
Nineteenth Day of August, 2025

Coke Morgan Stewart
*Acting Director of the United States Patent and Trademark Office* quarter to make a recording, just as if it was a vintage Voice-O-Graph record booth happened upon in the 1940s, though each sponsor may configurably price operation of the record booth, including the ability to insert additional coinage to make a longer recording. The sponsor may also pay for insertion of a promotional recording within the premium entertainment streams (e.g., within the Day's Best recordings, or within the Week's Best recordings. A user may promote their recording, giving it more preferential visibility on an initial broadcast board, depending upon the amount paid for the promotion. All points of revenue, and amounts, are completely configurable by the Admin.

Importantly, revenue is shared with each competition sponsor, providing incentive for the competition sponsor to both offer a nice prize package for the competition, as well as to promote the competition outside the Record Booth app, e.g., through other social networks, traditional media, etc. Revenue may also be shared with various licensing consortiums as necessary (e.g., BMI, ASCAP, etc.)

A user may enjoy the entertainment by listening or watching the Week's Best recordings, or get more deeply involved in the process of creating the premium entertainment stream by exploring the Day's Best recordings, or even watch the recordings on a LIVE board as they happen. Only the best recordings are archived for later search and enjoyment.

For those who want to explore the virtual experience of stepping into a record booth, any user may make their own recording in their Record Booth, either audio or video. It may be for the purpose of broadcast in one of the weekly competitions, or it may be just for fun. The idea is to foster the excitement of making a recording and then seeing it broadcast into a nationally-viewed entertainment stream. National competitions are open to all; local fundraiser or talent show competitions may be restricted (e.g., to only students of a given school) by use of a passcode.

Each recording is voted, or ranked, using both passive and active input from the watching public, including passive input such as number of views, and active input such as number of likes, to help a given recording move up to the Day's Best entertainment stream, and from there to the Week's Best entertainment stream.

The result is a modern, online take on say a 'Record Booth Idol', providing grass roots entertainment to all, as well as fun, opportunity, and social networking to those who make a record booth recording.

2 Customer
2.1 Splash Screen
Objective
The Splash screen is an initial screen of the mobile app which has logo of the application (company), It will display for small time interval and automatically move to next screen.
Operational Unit Record Booth Team
Department/Requesting Group Customer
Module Customer Mobile Application
Sub Module Splash Screen
Actor Applicable
 Input
 Output
Customer
Broadcast live streaming recordings (video and audio only)
Function Type Active Entity
Criticality Severe
Priority High
Access Level Customer
Pre Function N/A Post Function Automatically change the screen after a certain time interval
Mandatory Yes
Third Party Interface N/A
Developed By
Verified By
Business Rules
• A company logo will be displayed in bouncing mode on the splash screen.
• This process will be happened once at the time of open the app.
Alerts
• Logo will be splashed once and user move to login screen.
Assumption/Dependency
• Once at the time of open the app and after a certain time interval user will automatically move to next screen.
Acceptance Criteria
• This process is automate process to display the logo in bouncing mode and move to next screen without any
validations.
Screen Design
Screen Link http://7nctvt.axshare.com/#p=splash_screen
N/A
–
Placement in Process Navigation Cycle
• Splash screen– user will move to login screen after certain time interval.
2.2 Second Splash Screen
Objective
The Second Splash screen will contain the jpeg image of competition or any advertisements, on this screen user will have four actions as left, right, up and down.
Operational Unit Record Booth Team
Department/Requesting Group Customer
Module Customer Mobile Application
Sub Module Second Splash Screen
Actor Applicable
    Input
    Output
Swipe up, down, left and right.
Swipe up screen, Record screen, My Profile, Best of the Week.
Function Type Active Entity
Criticality Severe
Priority High
Access Level Customer
Pre Function N/A
Post Function User will perform action on this screen.
Mandatory Yes
Third Party Interface N/A
Developed By
Verified By Business Rules
• Second Splash Screen will contain a jpack image, which will be managed by the admin user,
• This screen will work like advertisements of the competitions which is posted by the Sponsors.
• After a first splash screen user will redirect on second splash screen where user will have a competition jpack image which will display details of the competition.
• There will be a channel selection drop down list from where user can select channel and according to channel competition image will be displayed.
• When user swipes right then user will be redirected on "Best of Week screen"
• When user swipes down then user will be redirected on "Record Screen"
• When user swipes left then user will be redirected to "My Profile Screen"
• When user swipes then user will be redirected to "Swipes Up screen"
Alerts
• For every new competition and advertisement, user will get a notification with specific details.
Assumption/Dependency
• We are assuming that user will have the gold coin balance to participate into the competition.
Acceptance Criteria
• User will perform the swipe actions and application should perform the respective action for respective user action.
Screen Design
Screen Link http://7nctvt.axshare.com/#p=splash_screen2
N/A
–
Placement in Process Navigation Cycle
• Splash screen 2 -> Select channel -> Slide screen to left, right, up and down
2.3 Third Splash Screen
Objective
The Third Splash screen will contain the jpeg image of the last selected competition channel or any advertisements. This Third Splash screen will be displayed for a short time after the First Splash screen and before the Second Splash screen,
Operational Unit Record Booth Team
Department/Requesting Group Customer
Module Customer Mobile Application
Sub Module Third Splash Screen
Actor Applicable
    Input
    Output
Click on Next Link
Move on next screen
Function Type Active Entity
Criticality Severe
Priority High
Access Level Customer
Pre Function N/A
Post Function User will perform action on this screen.
Mandatory Yes
Third Party Interface N/A Developed By
Verified By
Business Rules
• Third Splash Screen will contain a jpeg image, which will be managed by the admin user,
• When user clicks on "Next" link then s/he will be moved on next screen.
• This screen will contain all the competition related information.
Alerts
• For every new competition and advertisement, user will get a notification with specific details.
Assumption/Dependency
• On this screen splash screen will have an image which is uploaded by the admin.
Acceptance Criteria
• User will move on next screen by clicking on "Next" link.
Screen Design
Screen Link http://7nctvt.axshare.com/#p=splash_screen_3
N/A
_
Placement in Process Navigation Cycle
• Splash screen 3 -> Splash screen 2
2.4 Swipe up Screen
Objective
Swipe up screen will contain the competition image with competition details and participate function in competition,
Operational Unit Record Booth Team
Department/Requesting Group Customer
Module Customer Mobile Application
Sub Module Swipe Up Screen
Actor Applicable
  Input
  Output
Click on participate tab
Move to payment gateway screen
Function Type Active Entity
Criticality Severe
Priority High
Access Level Customer
Pre Function N/A
Post Function User will purchase the tokens.
Mandatory Yes
Third Party Interface N/A
Developed By
Verified By
Business Rules
• Swipe up screen will contain competition details image which will be uploaded by the admin.
• User can participate in competition by clicking on participate tab.
Alerts

- For every new competition and advertisement, user will get a notification with specific details.
details.
Assumption/Dependency
- On this screen user can participate in competition.
Acceptance Criteria
- User will participate in competition by clicking on participate tab.
Screen Design
Screen Link http://7nctvt.axshare.com/#p=swipe_up
N/A
−
Placement in Process Navigation Cycle
- Swipe up -> click on participate -> payment 2.5 Best of Week Screen
Objective
Best of Week screen will present the best rated recordings (in video form if available, or if not in audio form with record booth icon as image) in a given competition over the week of the competition.
Operational Unit Record Booth Team
Department/Requesting Group Customer
Module Customer Mobile Application
Sub Module Best of Week Screen
Actor Applicable
    Input
    Output
Ratings on recording
Ranking will be effected by ratings
Function Type Active Entity
Criticality Severe
Priority High
Access Level Customer
Pre Function N/A
Post Function It would be removed from best of week section one day after end of competition.
Mandatory Yes
Third Party Interface N/A
Developed By
Verified By
Business Rules
- Best of Week screen will keep the more favorite recordings that are coming from Best of Day (and Best of Day
− Audio only) pages.
 - A number of those recordings with the most likes, shares, views and favorites, as ranked by the formula with weighting set in the ADMIN, will be ranked sufficient to move to Best of Day, then those recordings with the highest rankings in the Best of Day over the course of the competition will be make it to be listed on the Best of Week pages. The number of recordings on the Best of Day and Best of Week pages, to be broadcast in an overall repeating loop, will be set by the ADMIN. Default will be 1 hour of recordings, repeated 24 times over one day.

- When user lands on this screen then there will be a playing recording with some call of actions as: Like, favorite, View and share the recording in video form (if available).
- When user records and broadcast the recording then at that time s/he will create title of the recording.
- There will be a chat function where user can add comments that will be displayed as superimposed on the screen.
- User can switch to Best of Week - Audio Only screen from this screen by clicking on "Audio" tab.
- User can select the competition channel and every selectable competition channel will be a current competition with best rated recordings.
- There won't be any chat history to view in future.
- Recordings will be shared on social sites as on Facebook and twitter.
- The maximum number of recordings in the repeating loop of the Best of Day and Best of Week pags (video and audio pages) will be set by configuration in the ADMIN.

Alerts
- If any recording gets a rating high enough to move it to the Best of Week pages, then the user will get a
notification (if enabled in Settings of user's Profile page).
- Every week or every time changes in best week screen will send a notification to the user.
- Other users who 'like' a given record booth of any recording in the Best of Week, will get
notification (if enabled in Settings of user's Profile page).

Assumption/Dependency
- Here one major assumption is that every competition channel will have Best of Week recordings so that user can select the competition channel, and according to which competition channel is selected, the Best of Week recordings from that competition will be played.

Acceptance Criteria
- User will click on "click on Best of Week" tab where a playing recording will be played in video form.

Screen Design
Screen Link http://7nctvt.axshare.com/#p=best_of_the_week
N/A
–
Placement in Process Navigation Cycle
- Best of Week -> Play -> Chat -> Select Competition Channel 2.6 Best of Week Screen – Audio Only
Objective
Best of Week – Audio Only screen will present the best rated audio version of recordings – audio only - in a given competition over the week of the competition.
Operational Unit Record Booth Team
Department/Requesting Group Customer
Module Customer Mobile Application
Sub Module Best of Week – Audio Only
Actor Applicable
    Input
    Output
Share, view, favorite the audio clip
Above factor will affect the ranking of audio clip.
Function Type Active Entity Criticality Severe
Priority High
Access Level Customer
Pre Function N/A
Post Function Audio clip would be removed from best of week section after the end of the competition in which it was broadcast.
Mandatory Yes
Third Party Interface N/A
Developed By
Verified By
Business Rules
• Best of week – audio screen will consist of best of week recordings in audio only form.
• Best audio recordings will be listed in order of current ranking on this screen.
• Every Audio clip will be the time of 01:05 seconds, depending upon the configuration setting in ADMIN.
• User can perform the following actions as: can make favorite the recording, or can make the recording and record booth that made the recording 'favorite', 'like' the recording, and can share the recording (in video form) on social media.
• There will be a title of the recording which comes at the time of recording.
• User can choose the competition channel accordingly from drop down.
• It will also show the user who created this recording with his/her details.
• A default media player will play the audio form of the recording (with displayed icon of the record booth) in mobile.
Alerts
• If any recording makes it to the Best of Week pages, then the user will get notification (if enabled in Settings of user's Profile page).
• Other users who 'like' the record booth of any recording that makes it to Best of Week will get notification (if enabled in each of those other users Settings of their respective Profile pages).
Assumption/Dependency
• Here one major assumption is that every competition channel will have Best of Week recordings so that the user can select the competition channel, and that competition channel's Best of Week recordings in audio only form will be played.
Acceptance Criteria
• User will click on "click on Best of Week – Audio only" tab where the audio-only form of each recording will be played, along with a display of the respective record booth icon for each.
Screen Design
Screen Link http://7nctvt.axshare.com/#p=best_of_week_-_audio_only
N/A
–
Placement in Process Navigation Cycle
• Best of Week – Audio Clip -> Play -> Select Channel
2.7 Best of Day Screen
Objective
Best of Week screen will present the best rated video recordings (in video form if available, or if not in audio form with record booth icon as image) in a given competition over the past day of the competition.

Operational Unit Record Booth Team
Department/Requesting Group Customer
Module Customer Mobile Application
Sub Module Best of Day Screen
Actor Applicable
    Input
    Output
Ratings on recording
Ranking will be affected by favorite, share and views calculation (rating).
Function Type Active Entity
Criticality Severe
Priority High
Access Level Customer
Pre Function N/A
Post Function It would be removed from Best of Day section after it has been in the Best of Day pages for 24 hours.
Mandatory Yes
Third Party Interface N/A
Developed By
Verified By
Alerts
• If any recording makes it to the Best of Day pages, then the user will be got notification (if enabled in that users Settings of their Profile page).
• Other users who have 'liked' a record booth of any recording in Best of Day pages will get notification of a recording from that liked record booth having made it to the Best of Day page.
Assumption/Dependency
• Here one major assumption is that every competition channel will have Best of Day recordings that user can select the competition channel and according to the competition channel the Best of Day recordings will be played.
Acceptance Criteria
• User will click on "Best of Day" tab where a playing recording in video form will be displayed.
Screen Design
Screen Link http://7nctvt.axshare.com/#p=best_of_the_day
N/A
–
Placement in Process Navigation Cycle
• Best of Day -> Play -> Chat -> Select Channel
2.8 Best of Day Screen – Audio Only
Objective
Best of Day – Audio Only screen will present the best rated audio version of recordings in a given competition over the past day of the competition.
Operational Unit Record Booth Team
Department/Requesting Group Customer
Module Customer Mobile Application
Sub Module Best of Day – Audio Only
Actor Applicable Input
Output
Share, view, favorite the audio clip
Above factor will affect the ranking of audio clip.
Function Type Active Entity
Criticality Severe
Priority High
Access Level Customer
Pre Function N/A
Post Function Audio clip would be removed from best of Day section after one day.
Mandatory Yes
Third Party Interface N/A
Developed By
Verified By
Business Rules
• Best of Day – audio screen will consist best (highest ranked or rated) recordings of the day (in audio form).
• Best audio recordings will be listed in order of correct ranking on this screen.
• Every Audio clip will be the time of 01:05 seconds (depending upon the configurable length set in ADMIN).
• User can perform the following actions as: can make favorite the recording, or can make the record booth that made the recording favorite or subscribed, like the recording, and can share the recording (in video form) on social media.
• There will be a title of the recording which comes at the time of recording.
• User can choose the competition channel accordingly from drop down.
• It will also show the user who created this recording with his/her details (the details to be displayed will be selected by setting in ADMIN and CONTEST MANAGEMENT).
• A default media player will play the audio form of the recording in mobile.
Alerts
• If any recording makes it to the Best of Day pages, then the user will get notification (if enabled in user's Setting page of their Profile page).
• Other users who 'like' a record booth, or are otherwise subscribed to follow a record booth, will receive a notification when a recording from that record booth makes it to the Best of Day in any competition channel.
Assumption/Dependency
• Here one major assumption is that every competition channel will have Best of Day recordings so that the user can select those competition channels, and according to the selected competition channel that Best of Day recordings will be played in audio only form.
Acceptance Criteria
• User will click on "click on Best of Day – Audio only" tab where a playing recording in audio form will be displayed.
Screen Design
Screen Link http://7nctvt.axshare.com/#p=best_of_week_-_audio_only
N/A
–

Placement in Process Navigation Cycle
• Best of Day – Audio Clip -> Play -> Select Channel
2.9 24hrs Recent Screen
Objective
24 hrs recent screen will consist of ALL recordings broadcast over the past 24 hrs in the selected competition channel.
Operational Unit Record Booth Team
Department/Requesting Group Customer
Module Customer Mobile Application
Sub Module 24 hrs Recent
Actor Applicable
    Input
    Output
User can filter the videos
Filtered result will be displayed.
Function Type Active Entity
Criticality Severe
Priority High
Access Level Customer
Pre Function N/A
Post Function Video clips would be removed from 24hrs recent section after a 24 hrs.
Mandatory Yes
Third Party Interface N/A
Developed By
Verified By
Business Rules
• 24 hrs recent screen will consist all those recordings that were uploaded in 24 hrs.
• 24 hrs recent screen will consist four search filters as: Search by Name, Search by category, Search by competition channel and search by title.
• On the behalf of search filter, filtered result will be displayed on the screen.
• There will be two tabs as all and trending recordings if user clicks on "All" tab then all the recordings which are being live in 24hrs displayed, if user clicks on "Trending" then "HOT" signed recordings will be displayed.
• On the same screen, listing of both type recordings will be displayed with following details as: record booth icon, title, favorites, views and likes with days.
• From this screen user can navigate to other screen as "Your Recent Broadcasts"
• User can delete any of their own recordings only by the default device function as slide towards left.
Alerts
• As such no notification will be sent on this screen.
Assumption/Dependency
• Here we are assuming that after 24 hrs any/all recording will be removed from the listing and there will not be managed any history for the recordings that didn't make it to the Best of Day page for the respective competition channel.
Acceptance Criteria
• User can navigate on this screen from menu section by clicking on 24hrs Recent recordings.
Screen Design Screen Link http://7nctvt.axshare.com/#p=24hrs_recent
N/A
–
Placement in Process Navigation Cycle
• More –> 24 hrs Recent -> All -> Trending
2.10 Your Recent Broadcast Screen
Objective
Your Recent Broadcast screen will consist of a listing of recent recordings made by a given wireless device record booth.
Operational Unit Record Booth Team
Department/Requesting Group Customer
Module Customer Mobile Application
Sub Module Your Recent Broadcasts
Actor Applicable
    Input
    Output
User can promote their recordings
Recording will be displayed as featured recording.
Function Type Active Entity
Criticality Severe
Priority High
Access Level Customer
Pre Function N/A
Post Function User has to purchase the subscription for promoting his/her videos.
Mandatory Yes
Third Party Interface N/A
Developed By
Verified By
Business Rules
• Your Recent broadcast screen will consist the recently broadcasted recordings of the user.
• If user wants to watch his/her broadcasts then in this section s/he can view the broadcast.
• If user wants to promote his/her recordings then s/he click on promote tab and user will be redirected on Promote Video page.
• On Promote Video page user will select the promotion level from drop down list and clicks on "proceed" tab.
• When user clicks "Proceed" tab then s/he will be redirected on payment gateway from where user will pay and his/her video will be promoted.
• On the same screen, listing of both type videos will be displayed with following details as: record booth icon, title, favorites, views and likes with days.
• Promoted recordings will be displayed highlighted with prominent corner banner as "HOT" text.
• There will be two tabs as "All" and "Trending" videos if user clicks on "All" tab then all the recordings which are being live in 24hrs displayed, if user clicks on "Trending" then "HOT" signed videos will be displayed.
• User can delete only their own recordings by the default device function as slide towards left.
Alerts
• As such no notification will be sent on this screen.

Assumption/Dependency
• Here all recordings and trending recordings may be similar on some instance.
Acceptance Criteria
• User can navigate on this screen from menu section by clicking on "Your Recent Broadcast" recordings.
Screen Design
Screen Link http://7nctvt.axshare.com/#p=your_recent_broadcasts
N/A
Placement in Process Navigation Cycle
• More –> Your Recent Broadcast -> All -> Trending
2.11 Currently Live Screen
Objective
Currently live screen will list, in storyboard, all currently live recordings as they are uploaded.
Operational Unit Record Booth Team
Department/Requesting Group Customer
Module Customer Mobile Application
Sub Module Currently Live
Actor Applicable
 Input
 Output
Upload live broadcasts
Playing in by default media player.
Function Type Active Entity
Criticality Severe
Priority High
Access Level Customer
Pre Function N/A
Post Function A certain number of live video broadcasts will be displayed and rest of broadcasts will be in queue.
Mandatory Yes
Third Party Interface N/A
Developed By
Verified By
Business Rules
• Currently live broadcasts will be displayed with a badge "Live".
• Live broadcasts videos will consist of title of the broadcast, No. of user who are currently watching this broadcast.
• Every Live broadcast session will display the user profile who uploaded that session.
• Every live broadcast session will include no. of favorites of the record booth, views and share.
• Live broadcast session will show the location of broadcast from where it is being broadcasted (if enabled by user in Profile).
• Whenever the live session finishes that recording will be removed from currently live screen and moved to the 24 Hrs Recent page.
Alerts
• If any user subscribe any record booth, and on any competition channel a new live broadcast will come live from that record booth, then a notification will be sent to the user (if enabled in Settings of each user's Profile).
When that user click on the notification then he will be redirected on that live session.
Assumption/Dependency
• Currently live session will not be kept in any history.
Acceptance Criteria
• User can navigate on this screen from More section by clicking on "Currently Live" videos.
Screen Design
Screen Link http://7nctvt.axshare.com/#p=currently_live
N/A
_
Placement in Process Navigation Cycle
• More –> Currently Live -> Play Video
2.12 Archived Best Screen
Objective
Archived best screen will consist of all those recordings that reached at least Best of Day in any given competition.
Operational Unit Record Booth Team
Department/Requesting Group Customer
Module Customer Mobile Application
Sub Module Archived Best
Actor Applicable
    Input
    Output
Left slide the video and mark as Archived best
N/A
Function Type Active Entity
Criticality Severe
Priority High
Access Level Customer
Pre Function N/A
Post Function User can remove the video from Archived best section.
Mandatory Yes
Third Party Interface N/A
Developed By
Verified By
Business Rules
• Archived best screen will only consist of recordings from Best of Day and Best of Week pages of
ALL
competition channels.
• Archived best screen will have four search filters as: "Search by Name" "Search by Category" "Search by Channel" "Search by Title"
• Every Archived best recording will have following ratings on recording as: record booth Icon, Title, No. of Favorites, No. of views, No. of share, and uploaded time.
Alerts
• No notification will be taken place on this screen.
Assumption/Dependency

- Archived Best screen will consist most rated screen.

Acceptance Criteria
- User can navigate on this screen from More section by clicking on "Archived Best" videos.

Screen Design
Screen Link http://7nctvt.axshare.com/#p=archived_best
N/A
–

Placement in Process Navigation Cycle
- More –> Archived Best -> Play video 2.13 Previously Viewed Videos Screen Objective
Previously viewed screen will consist of all recordings, video or audio only, that were viewed or listened to by a given wireless device record booth, with the latest recordings at the top.
Operational Unit Record Booth Team
Department/Requesting Group Customer
Module Customer Mobile Application
Sub Module Previously Viewed Videos
Actor Applicable
    Input
    Output
N/A
N/A
Function Type Active Entity
Criticality Severe
Priority High
Access Level Customer
Pre Function N/A
Post Function User can clear all the previously viewed videos from this screen.
Mandatory Yes
Third Party Interface N/A
Developed By
Verified By Business Rules
- Previously Viewed screen will have all those recordings which were viewed by the user earlier.
- All viewed recordings will automatically showcase in this screen.
- User can clear all the recordings from the list by clicking on clear all, clear all function will come by sliding the video left side.
- This screen will include a certain no. of videos listing.

Alerts
- As such no notification will be sent on this screen.

Assumption/Dependency
- Here user can view these recordings again.

Acceptance Criteria
- User can navigate on this screen from More menu section by clicking on "Previously Viewed" recordings.

Screen Design
Screen Link http://7nctvt.axshare.com/#p=previously_viewed
N/A
–
Placement in Process Navigation Cycle
• More –> Previously Viewed -> Play Video Session 2.14 Record Screen
Objective
Record screen will function to record a record booth recording, video or audio only, and broadcast the recording into a selected competition channel.
Operational Unit Record Booth Team
Department/Requesting Group Customer
Module Customer Mobile Application
Sub Module Record
Recording
Voice Recording
Actor Applicable
    Input
    Output
Click on Record video Icon or Record Audio only icon
Video or audio only will be recorded.
Function Type Active Entity
Criticality Severe
Priority High
Access Level Customer
Pre Function N/A
Post Function User can cancel the recording of the video.
Mandatory Yes
Third Party Interface N/A
Developed By
Verified By
Business Rules
• When user lands on Record screen then there will be a choice to record either videos or audios.
• User can set his/her record booth name in "Set your Record Booth name" input box.
• User will fill the title of the Recording.
• User will have the option to fill the name of the original artist name (optional).
• For recording user will have to use the tokens and according to the token user can record videos and audios.
• Token balance will be displayed.
• There will be four selection dropdown list as: "Select Video Filter" "Select Audio Filter" "Set Channel" "Set Category"
• All the data has been set by the user then user will be navigated on the "Recording" screen for video, or "Voice Recording" screen for audio only, where recording will be started.
• On Recording screen there will be a tab as "Stop or Pause" by clicking on these tabs recording will be stopped or paused respectively.

- When user clicks on Cancel tab then the recording will be cancelled and back to Record screen.
- If user clicks on "Next" tab then on the moment user will be redirected on the "Your Recent Broadcasts" Screen.
- Recording will be done for 01:05 seconds only (depending upon ADMIN setting, and also depending upon the number of tokens input). Default length of recording is 1:05.
- Device camera will be accessed for video recording.
- A timer will be run on the recording screen which shows the time of recording.
- Voice Recording screen will have two options as: Stop and pause the voice recording.
- If user clicks on stop recording icon then s/he will be redirected on the "Record" screen.
- If user clicks on pause icon then s/he will remain on the same screen.
- Name of the user will be displayed on the top of the screen.

Alerts
- As such no notification will be sent on this screen.

Assumption/Dependency
- Here we are assuming that all the data filled here will be displayed at the time of being broadcasted or uploaded.

Acceptance Criteria
- User can navigate on this screen from Bottom Menu section by clicking on "Record" videos.

Screen Design
Screen Link http://7nctvt.axshare.com/#p=record
http://7nctvt.axshare.com/#p=recording
http://7nctvt.axshare.com/#p=voice_recording
N/A
–

Placement in Process Navigation Cycle
- Bottom Menu –> Record -> Recording screen
- Bottom Menu –> Record -> Voice Recording screen 2.15 People Screen
Objective
The People screen will consist of a searchable list of all users of the Record Booth app network-wide.
Operational Unit Record Booth Team
Department/Requesting Group Customer
Module Customer Mobile Application
Sub Module People
Actor Applicable
    Input
    Output
Search parameters
Alphabetical list of users matching input search parameters.
Function Type Active Entity
Criticality Severe
Priority High
Access Level Customer
Pre Function N/A
Post Function User can see the profile of any listed user by clicking Mandatory Yes
Third Party Interface N/A
Developed By
Verified By
Business Rules
• People screen will consist list of users who have downloaded and registered their Record Booth App.
• User listing will consist following details on the screen as User icon, Name, channel, Category, make favorite.
• This screen will include four search filters as: Search by Name, Search by Category, Search by Channel, Search by title.
• When user clicks on any user's icon then it will redirect this user on the profile of the other user.
Alerts
• When user makes any other user a favorite, then a notification will be sent to the user made favorite (if enabled in Setting of Profile page of that user). Assumption/Dependency Acceptance Criteria
• User can navigate on this screen from "More Menu" section by clicking on "People" videos.
Screen Design
Screen Link http://7nctvt.axshare.com/#p=people
N/A
–
Placement in Process Navigation Cycle
• More –> People -> List of People
2.16 My Profile Screen
Objective
My Profile screen will consist of the details of the user.
Operational Unit Record Booth Team
Department/Requesting Group Customer
Module Customer Mobile Application
Sub Module My Profile
Settings
Help Centre
Actor Applicable
    Input
    Output
Edit the profile
Update the details
Function Type Active Entity
Criticality Severe
Priority High
Access Level Customer
Pre Function N/A
Post Function User can edit the details of the details.
Mandatory Yes
Third Party Interface N/A
Developed By
Verified By
Business Rules

- My Profile Screen will consist the user details.
- User can edit and update the details.
- My profile will include the following details as:

a. Record Booth Name
b. Settings
c. Broadcasts
d. Share Record Booth
e. Help Centre
f. Send Feedback
g. Legal
h. Logout

- Settings screen will include the following functions as:

a. Push Notification: ON/OFF
c. Set Video Filter: ON/OFF
d. Set Audio Filter: ON/OFF
e. Change Password
f. Other : Preferred Language and Auto-save Broadcasts: ON/ OFF

- User can upload his/her image and can change the image in future.
- Below the name of the user, number of favorite will be showed.
- Help Centre will include the following details as:

a. If any user have the queries then there will be listing the queries according to the "Topic" "Account" and "Broadcasting"
b. User will have answer with respect to the question.

- User can send the feedback about the experience of the application.
- Legal will show the legal agreement of the application.
- When user clicks on logout tab then user will be exited from the application.

Alerts
- If user set the notification ON then that user will get notifications.

Assumption/Dependency
- We are assuming that "settings" "Your Recent Broadcast" and "Help Centre" will be kept in My Profile section.

Acceptance Criteria
- User can navigate on this screen from "More Menu" section by clicking on "People" videos.

Screen Design
Screen Link http://7nctvt.axshare.com/#p=my_profile
http://7nctvt.axshare.com/#p=settings
http://7nctvt.axshare.com/#p=help_center
N/A
–
Placement in Process Navigation Cycle
- Bottom Menu –> Profile -> Settings -> Help Centre -> Broadcasts 2.17 Login/Registration Objective
The Login/Registration screen will consist of login for a user, and entry/registration of that user in any competition with purchase of a token for that competition.

Operational Unit Record Booth Team
Department/Requesting Group Customer
Module Customer Mobile Application
Sub Module Login
Registration
Actor Applicable
    Input
    Output
User will register
Then user can login in the app
Function Type Active Entity
Criticality Severe
Priority High
Access Level Customer
Pre Function N/A
Post Function If user is not registered then first he will come on registration screen.
Mandatory Yes
Third Party Interface N/A
Developed By
Verified By
Business Rules
• User will register his/her details as:
a. First name
b. Last Name
c. Email
d. Password
e. Select competition channel
• User will fill the above details and then clicks on "Sign up" tab
• If user clicks on "Cancel" tab then all the details will be reset.
• When user filled all the mandatory details then s/he will be able to login into the application.
• User can login through: twitter, Facebook, and google plus.
• User will fill the username as an email ID and password to login into the app.
• If user forgot his/her password then by clicking on forgot password link user will get password in mail.
• Competition channel list on registration screen will come from the application which are already defined in the app.
Alerts
• As such no notification will be sent to the user on this event.
Assumption/Dependency
• Only registered user can login into the application.
Acceptance Criteria
• User will first come on registration screen and then on login screen.
Screen Design
Screen Link http://7nctvt.axshare.com/#p=login
http://7nctvt.axshare.com/#p=registration
N/A Placement in Process Navigation Cycle
• Application –> Registration -> Login -> Splash screen
2.18 PayPal Screen
Objective
PayPal is a third party API through which a user will be able to transfer money for purchase of tokens, promotions, etc.
Operational Unit Record Booth Team
Department/Requesting Group Customer
Module Customer Mobile Application
Sub Module PayPal
Actor Applicable
  Input
  Output
Purchase Tokens
PayPal Screen
Function Type Active Entity
Criticality Severe
Priority High
Access Level Customer
Pre Function N/A
Post Function New User has to register on PayPal.
Mandatory Yes
Third Party Interface N/A
Developed By
Verified By
Business Rules
• PayPal screen is a third party API to transfer the money.
• If user wants to participate in competition then he has to purchase the coins.
• If user purchase the coin by clicking on purchase coin then s/he has to clicks on purchase tab and s/he will be redirected on PayPal screen.
• If user clicks on cancel tab then he will be redirected on competition screen that means third splash screen.
Alerts
• As such no notification will be generated on this event.
Assumption/Dependency
• All the user will register on PayPal to transfer the money.
Acceptance Criteria
• User will participate in content and clicks on purchase token then he will be redirected on PayPal Screen.
Screen Design
Screen Link http://7nctvt.axshare.com/#p=paypal
N/A

—

Placement in Process Navigation Cycle
• Purchase tokens –> PayPal -> Pay Money

The following is an algorithm design specification for an exemplary administrator terminal of a record booth session network, in accordance with an embodiment of the present invention.

DESIGN SPECIFICATION FOR RECORD BOOTH SESSION NETWORK ADMINISTRATOR

1 Objective

The Record Booth Application is a new social entertainment network app. Inspired by the vintage Voice-O-Graph record booths, it's a social entertainment network built on the enjoyment of listening and/or watching in on short, fair-use type "record booth" recording sessions (e.g., 65 seconds long as in the vintage Voice-O-Graph record booths). The Record Booth app provides the capability to broadcast recordings within the context of a weekly competition, with each recording being ranked according to its popularity in the entertainment feed, number of views, number of actions in other social networks (e.g., likes, etc.) The best recordings make it into the Day's Best stream, and the best of those into a Week's Best stream, from which the overall best for that week's competition are determined.

At its root the Record Booth app provides not only entertainment for those who listen and/or watch the process, but also pure fun and even opportunity for those who step into the record booth and broadcast their recording. Audio and video filters are provided for selection to artistically flavor the recording (e.g., emulate the sound of a 1940s microphone; the visual look of a 1950s B&W television, a 1960s color television; the added surface sound of a worn vinyl record, etc.)

In the initial splash page shown upon bootup, an image of the weekly sponsor's billboard is shown as if glued inside the door of a vintage record booth. The Record Booth Application has the capability to simultaneously support multiple different sponsors and competitions, e.g., one that is national in scope, and dozens or even hundreds of local competitions. The available competitions may be as large as National or International in scope, or as small and local as an online version of a high school talent show run as a local fundraiser. Nevertheless, each creates a series of broadcast entertainment streams (configurable by the Admin as audio only, or video capable), that the public may watch passively and for no cost.

The Record Booth app is intended to be available as a free download, and the vast majority of users will merely watch and/or listen to any of the broadcast entertainment streams for free. However, numerous revenue points are implemented to generate a stream of revenue. The record booth takes a quarter to make a recording, just as if it was a vintage Voice-O-Graph record booth happened upon in the 1940s, though each sponsor may configurably price operation of the record booth, including the ability to insert additional coinage to make a longer recording. The sponsor may also pay for insertion of a promotional recording within the premium entertainment streams (e.g., within the Day's Best recordings, or within the Week's Best recordings. A user may promote their recording, giving it more preferential visibility on an initial broadcast board, depending upon the amount paid for the promotion. All points of revenue, and amounts, are completely configurable by the Admin.

Importantly, revenue is shared with each contest sponsor, providing incentive for the contest sponsor to both offer a nice prize package for the competition, as well as to promote the contest outside the Record Booth app, e.g., through other social networks, traditional media, etc. Revenue may also be shared with various licensing consortiums as necessary (e.g., BMI, ASCAP, etc.)

A user may enjoy the entertainment by listening or watching the Week's Best recordings, or get more deeply involved in the process of creating the premium entertainment stream by exploring the Day's Best recordings, or even watch the recordings on a LIVE board as they happen. Only the best recordings are archived for later search and enjoyment.

For those who want to explore the virtual experience of stepping into a record booth, any user may make their own recording in their Record Booth, either audio or video. It may be for the purpose of broadcast in one of the weekly contests, or it may be just for fun. The idea is to foster the excitement of making a recording and then seeing it broadcast into a nationally-viewed entertainment stream. National competitions are open to all; local fundraiser or talent show competitions may be restricted (e.g., to only students of a given school) by use of a passcode.

Each recording is voted, or ranked, using both passive and active input from the watching public, including passive input such as number of views, and active input such as number of likes, to help a given recording move up to the Day's Best entertainment stream, and from there to the Week's Best entertainment stream.

The result is a modern, online take on say a 'Record Booth Idol', providing grass roots entertainment to all, as well as fun, opportunity, and social networking to those who make a record booth recording.

2 Administrator 2.1 Administrator Login

Objective

The Administrator Login screen will consist of a login process.
Operational Unit Record Booth Team
Department/Requesting Group Administrator
Module Administrator Web Application
Sub Module Login
Actor Applicable
    Input
    Output
Admin fill the login credentials
Login into the web app
Function Type Active Entity
Criticality Severe
Priority High
Access Level Administrator only
Pre Function N/A
Post Function Admin has to login in order to access the application
Mandatory Yes
Third Party Interface N/A
Developed By
Verified By
Business Rules
• User will fill the login credentials as "Email ID" and "Password"
• If admin check mark in box to "Remember Me" then system will not ask again for login credentials.
• When admin clicks on forgot password then an email will be sent to admin's registered email id.
• When admin clicks on "Clear" tab then all filled in data will be reset.

Alerts
• If admin enters wrong credentials more than three times, then an email will be sent to the registered email ID to reset the details.

Assumption/Dependency
• Only registered user (Admin) can login into the application.

Acceptance Criteria

• Admin user will type url of admin panel and fill the login credentials to login.
Screen Design
Screen Link http://n4tmyi.axshare.com/#p=login
N/A
–
Placement in Process Navigation Cycle
• Web Application URL –> Login
2.2 Administrator Dashboard
Objective
The Administrator Dashboard screen will consist of statistics of current operations of Record Booths network-wide.
Operational Unit Record Booth Team
Department/Requesting Group Administrator
Module Administrator Web Application
Sub Module Dashboard
Actor Applicable
    Input
    Output
No Input will be applicable
User Data will be displayed or reporting purpose
Function Type Active Entity
Criticality Severe
Priority High
Access Level Administrator only
Pre Function N/A
Post Function User can access the modules from Dashboard
Mandatory Yes
Third Party Interface N/A
Developed By
Verified By
Business Rules
• Dashboard will display total number of currently active users.
• Dashboard will display total number of currently streaming video Broadcasts overall.
• Dashboard will display total number of currently streaming audio Broadcasts overall.
• Dashboard will provide search capability for any user, by Record Booth name, or registered email.
• When admin clicks on Details tab then the user's profile will be opened with relevant information.
• There will be a User table which will show following details as:
a. User name (Participated in Contest)
b. User's registered email.
c. Current Status
d. Number of Broadcasts over a period of time (default is over all time.)
e. Number of Views of the Broadcasts listed in the Number of Broadcasts
f. List of all broadcasts from that user to reach Best of Week
g. List of all broadcasts from that user to reach Best of Day
h. List of all broadcasts from that user to reach 24 Hrs Recent page
• There will be a search filter on top with title as "Search User"

Alerts
• As such no Notification will be generated.
Assumption/Dependency
• As of now, no assumptions take place.
Acceptance Criteria
• Admin user will type url of admin panel, login into the app and redirects on Dashboard screen.
Screen Design
Screen Link http://n4tmyi.axshare.com/#p=dashboard_home
N/A
–
Placement in Process Navigation Cycle
• Web Application URL –> Login -> Dashboard
2.3 Administrator Profile
Objective
The Administrator Profile screen will consist of all of the details of the Administrator.
Operational Unit Record Booth Team
Department/Requesting Group Administrator
Module Administrator Web Application
Sub Module Profile
Actor Applicable
    Input
    Output
Input the details
Profile Information
Function Type Active Entity
Criticality Severe
Priority High
Access Level Administrator only
Pre Function N/A
Post Function Admin can update his/her details.
Mandatory Yes
Third Party Interface N/A
Developed By
Verified By
Business Rules
• Profile will have the admin's details with profile image:
Name
email address
alternate email address
contact phone number
alternate contact phone number
username
password
profile image
• Admin can update his/her profile details.
• Profile image size will be fixed as per designer recommendation.

• When admin clicks on "Save" tab then all the changes will be updated accordingly.
Alerts
• As such no Notification will be generated.
Assumption/Dependency
• As of now, no assumptions take place.
Acceptance Criteria
• Admin user will type url of admin panel, login into the app and redirects on Profile screen.
Screen Design
Screen Link http://n4tmyi.axshare.com/#p=profile
N/A
–
Placement in Process Navigation Cycle
• Web Application URL –> Login -> Dashboard -> Profile
2.4 Contest Management
Objective
The Contest Management page will manage all the contest related details.
Operational Unit Record Booth Team
Department/Requesting Group Administrator
Module Administrator Web Application
Sub Module Contest Management
Actor Applicable
    Input
    Output
Create, update, add, delete contest
Updated Results
Function Type Active Entity
Criticality Severe
Priority High
Access Level Administrator only
Pre Function N/A
Post Function Admin can make changes in this section
Mandatory Yes
Third Party Interface N/A
Developed By
Verified By
Business Rules
• Admin will create the contest from this section, when admin clicks on create contest then a form will be opened with following details as:
a. Promotional Code (if any, default is no promotional code)
b. Title of the contest
c. Contest from and To date
d. Contest Price
e. % Commission to contest sponsor
f. Select stream type for Contest (video(default) or audio)
g. Upload JPG image of the billboard for the contest
h. Contest Channel Name for the contest i. Contest recording time (default is 65 seconds)
- After filling above details in the form, admin can publish the contest by clicking on "Publish" tab.
- at 12:01am on contest start date, until 12pm on the contest end date, the billboard image is included on the splash page, and the Contest Channel Name becomes available for selection, etc.
- Switch user functions allow the admin to switch the mode of the entertainment screens for that contest between Video and Audio:

a. Admin clicks on Switch to currently live screen (video or audio only).
b. Admin clicks on Switch to 24 hrs Recent screen (video or audio only).
c. Admin clicks on Switch to BoD screen (video or audio only).
d. Admin clicks on Switch to BoW screen (video or audio only).
e. Admin clicks on Switch to Archived Best screen (video or audio only).
f. Admin clicks on Switch to Previously Viewed screen (video or audio only).
g. Admin clicks on Switch to My Recent Broadcast screen (video or audio only).

- There will be number of filters to search for a published contest:

a. Search by Promotional Code:
b. Search by Title of the Contest:
c. Search by To & Fro Date:
d. Search by Contest Price:
e. Search by % Commission:
f. Search by Channel Name:

- There will also be two record booth tables storing different information about the contest.
- Both tables will have the action tab so that admin can delete and edit the record.
- Table 1 will have the video and audio link, admin can view the respective audio and video.
- On the bottom there will be a confidential message.

Alerts
- If admin publishes New Contest then a notification will be sent to all the active users.
- If admin edits any detail of Active contest then participated users will get the notification.

Assumption/Dependency
- We are assuming that if admin deletes any active contest then participated amount will be refunded to all the contestants.

Acceptance Criteria
- Admin user will type url of admin panel, login into the app and redirects on Contest Management.

Screen Design
Screen Link http://n4tmyi.axshare.com/#p=contest_management
N/A
–
Placement in Process Navigation Cycle
- Web Application URL –> Login -> Dashboard -> Contest Management 2.5 Channel Management
Objective
The Channel Management page will consist of the list of all existing channel names, with the ability to create new channels.
Operational Unit Record Booth Team
Department/Requesting Group Administrator
Module Administrator Web Application Sub Module Channel Management
Actor Applicable
    Input
    Output
Create, update, add, delete the channel
Updated Results
Function Type Active Entity
Criticality Severe
Priority High
Access Level Administrator only
Pre Function N/A
Post Function N/A
Mandatory Yes
Third Party Interface N/A
Developed By
Verified By
Business Rules
• Admin will create the channel from this section and all the created channel will be reflected everywhere channel dropdown list exists in mobile app and web app as well.
• When admin clicks on "Create Channel" tab a form will be opened with following details as:
a. Channel Code
b. Channel Name
c. Category Name
• By filling above details, when admin clicks on save tab then a new channel will be created.
• Channel table will keep all the necessary details as:
a. Channel Code
b. Channel Name
c. Category
d. Channel Rank
e. New published video/audio links
f. Action tab
• Admin can delete or edit the channel details by clicking on action tab.
Alerts
• If admin creates new channel then a notification will be sent to all active users.
Assumption/Dependency
• Channel Rank will be calculated by applying the formula in programing.
Acceptance Criteria
• Admin user will type url of admin panel, login into the app and redirects on Channel Management.
Screen Design
Screen Link http://n4tmyi.axshare.com/#p=channel_management
N/A
–
Placement in Process Navigation Cycle
• Web Application URL –> Login -> Dashboard -> Channel Management
2.6 Scoring Management
Objective The Scoring Management page will consist of all passive factors and all active factors used to rank a broadcast recording, and the weighting to be applied to each factor in arriving at the total ranking of each recording.
Operational Unit Record Booth Team
Department/Requesting Group Administrator
Module Administrator Web Application
Sub Module Scoring Management
Actor Applicable
    Input
    Output
Create, edit and download the data
Ranking Score of the video/Audio
Function Type Active Entity
Criticality Severe
Priority High
Access Level Administrator only
Pre Function N/A
Post Function N/A
Mandatory Yes
Third Party Interface N/A
Developed By
Verified By
Business Rules
• This application will have some distinct parameters, and on the behalf of these parameters each audio or video recording will be assigned a rank (aka a vote).
• This screen will consist of a table with the following information:
• The identity of each active factor to be used in ranking, including, e.g. a number of likes of the recording via other social media such as facebook; a number of favorites that the record booth that made the recording has, etc.
• The weighting ascribed to each active factor (a fraction between 0.000 and 1.000).
• The identity of each passive factor to be used in ranking, including, e.g., a number of views of the recording; an average of a given number of prior recordings from that record booth, etc.
• The weighting ascribed to each passive factor (a fraction between 0.000 and 1.000).
• On the behalf of all the data a dynamic ranking of each recording will be calculated.
Alerts
• As such no notification will be generated on this event.
Assumption/Dependency
• We are assuming all the data will come from live activities and a calculated data will be updated on this screen.
Acceptance Criteria
• Admin user will type url of admin panel, login into the app and redirects on Scoring Management.
Screen Design
Screen Link http://n4tmyi.axshare.com/#p=scoring_management
N/A
—

Placement in Process Navigation Cycle
• Web Application URL –> Login -> Dashboard -> Scoring Management 2.7 Payment Management
Objective
The Payment Management page will consist of all the sponsors and other revenue sharing entities to be paid for contests over a given time period.
Operational Unit Record Booth Team
Department/Requesting Group Administrator
Module Administrator Web Application
Sub Module Payment Management
Actor Applicable
  Input
  Output
Scheduling Payment for Sponsors
Transfer payments on schedule date
Function Type Active Entity
Criticality Severe
Priority High
Access Level Administrator only
Pre Function N/A
Post Function N/A
Mandatory Yes
Third Party Interface N/A
Developed By
Verified By
Business Rules
• Payment Management section will consist of all payment data.
• Admin can schedule payment for multiple users on multiple dates.
• Schedule payment will automatic transfer to the sponsors account through PayPal.
• Account details of the sponsors will be added in PayPal.
• First Payment will be come in Admin's bank account. (This payment belongs to contest Participation amount of the app users) then after defined % of commission, payment will be transferred to others sponsors as per schedule date.
• There will be three tables of Payment as:
a. Schedule Payment details: in which admin can view the scheduled payment details.
b. Previous Payment details: This will show previously transferred payments to sponsors.
c. Received Payment Details: This table will show the contest amount which came from the participants.
Alerts
• When admin schedule the payment to sponsors then sponsors will get a notification by email.
Assumption/Dependency
• We are assuming that third party API will response for payment scheduling.
Acceptance Criteria
• Admin user will type url of admin panel, login into the app and redirects on Payment Management.
Screen Design
Screen Link http://n4tmyi.axshare.com/#p=payment_management N/A
_
Business Rules
Placement in Process Navigation Cycle
• Web Application URL –> Login -> Dashboard -> Payment Management
2.8 Settings
Objective
The Settings page will consist of all network settings not already included within another Admin page.
Operational Unit Record Booth Team
Department/Requesting Group Administrator
Module Administrator Web Application
Sub Module Settings
Actor Applicable
    Input
    Output
Set Parameters
Reflects in mobile app
Function Type Active Entity
Criticality Severe
Priority High
Access Level Administrator only
Pre Function N/A
Post Function N/A
Mandatory Yes
Third Party Interface N/A
Developed By
Verified By
Business Rules
• Admin will set max. no. of tokens that can be purchased by any one mobile app user for any one given contest.
• Admin will set the price points to permit promotion of a recording by inputting the amount in "set price for promotion"
• Admin can set the maximum recording time (audio or video) obtained per inserted token.
• Admin can create new audio filters, and new video filters, that can thereafter be selected by users as they make a recording.
• When admin clicks on "Apply" tab then all result will be updated accordingly.
• A table maintaining statistics relating to the settings will be maintained.
Alerts
• As such no notification will be generated on this event.
Assumption/Dependency
• We are assuming that some filters will be predefined in the app.
Acceptance Criteria
• Admin user will type url of admin panel, login into the app and redirects on settings.
Screen Design
Screen Link http://n4tmyi.axshare.com/#p=settings
N/A

—

Placement in Process Navigation Cycle
• Web Application URL –> Login -> Dashboard -> Settings While the invention has been described with reference to the exemplary embodiments thereof, those skilled in the art will be able to make various modifications to the described embodiments of the invention without departing from the true spirit and scope of the invention.--